US009569797B1

(12) United States Patent
Rohn et al.

(10) Patent No.: US 9,569,797 B1
(45) Date of Patent: Feb. 14, 2017

(54) SYSTEMS AND METHODS OF PRESENTING SIMULATED CREDIT SCORE INFORMATION

(75) Inventors: Janice Anne Rohn, Redondo Beach, CA (US); Julia E. Fegel, Newport Beach, CA (US); Jeffrey Bryan Mahacek, Irvine, CA (US); Michael Burger, Aliso Viejo, CA (US)

(73) Assignee: CONSUMERINFO.COM, INC., Costa Mesa, CA (US)

( * ) Notice: Subject to any disclaimer, the term of this patent is extended or adjusted under 35 U.S.C. 154(b) by 163 days.

(21) Appl. No.: 13/326,803

(22) Filed: Dec. 15, 2011

(51) Int. Cl.
*G06Q 40/00* (2012.01)
*G06Q 40/02* (2012.01)
G06F 3/0484 (2013.01)
G06Q 40/08 (2012.01)

(52) U.S. Cl.
CPC ......... *G06Q 40/025* (2013.01); *G06F 3/04847* (2013.01); *G06Q 40/08* (2013.01)

(58) Field of Classification Search
CPC ............................... G06Q 40/00; G06Q 40/02
USPC .......................................................... 705/38
See application file for complete search history.

(56) References Cited

U.S. PATENT DOCUMENTS

| 3,316,395 | A | 4/1967 | Lavin |
| 4,305,059 | A | 12/1981 | Benton |
| 4,578,530 | A | 3/1986 | Zeidler |
| 4,736,294 | A | 4/1988 | Gill |
| 4,774,664 | A | 9/1988 | Campbell et al. |
| 4,876,592 | A | 10/1989 | Von Kohorn |
| 4,891,503 | A | 1/1990 | Jewell |
| 4,895,518 | A | 1/1990 | Arnold |

(Continued)

FOREIGN PATENT DOCUMENTS

| EP | 0 350 907 | 1/1990 |
| EP | 0 468 440 | 1/1992 |

(Continued)

OTHER PUBLICATIONS

Announcing TrueProfiler, Dec. 1, 2002, http://web.archive.org/web/20021201123646/http://www.truecredit.com/index.asp, 2 pages.

(Continued)

*Primary Examiner* — Abhishek Vyas
(74) *Attorney, Agent, or Firm* — Knobbe Martens Olson & Bear, LLP

(57) ABSTRACT

In an embodiment, a computer system receives credit information relating to a consumer, and calculates a credit score associated with the consumer. The system constructs a credit score scenario user interface. The system maintains a plurality of credit score simulation scenarios, and calculates a plurality of simulated credit scores associated with respective credit score simulation scenarios. The system also constructs a credit score simulation control interface. The system maintains a plurality of credit score simulation parameters, and generates a user interface with a graphical indication of the calculated credit score and a plurality of sliders, each slider being divided into segments that are colored to graphically indicate the likely effect of repositioning the slider within the respective segment. When the user repositions the sliders, the graphical indication of the calculated credit score is adjusted, based on a recalculation of the credit score.

4 Claims, 17 Drawing Sheets

(56) References Cited

U.S. PATENT DOCUMENTS

| | | |
|---|---|---|
| 4,947,028 A | 8/1990 | Gorog |
| 5,013,038 A | 5/1991 | Luxenberg et al. |
| 5,025,138 A | 6/1991 | Cuervo |
| 5,025,373 A | 6/1991 | Keyser, Jr. et al. |
| 5,034,807 A | 7/1991 | Von Kohorn |
| 5,060,153 A | 10/1991 | Nakagawa |
| 5,148,365 A | 9/1992 | Dembo |
| 5,220,501 A | 6/1993 | Lawlor et al. |
| 5,239,462 A | 8/1993 | Jones et al. |
| 5,259,766 A | 11/1993 | Sack |
| 5,262,941 A | 11/1993 | Saladin |
| 5,274,547 A | 12/1993 | Zoffel et al. |
| 5,297,031 A | 3/1994 | Gutterman et al. |
| 5,336,870 A | 8/1994 | Hughes et al. |
| 5,361,201 A | 11/1994 | Jost et al. |
| 5,590,038 A | 12/1996 | Pitroda |
| 5,611,052 A | 3/1997 | Dykstra et al. |
| 5,615,408 A | 3/1997 | Johnson |
| 5,630,127 A | 5/1997 | Moore et al. |
| 5,640,577 A | 6/1997 | Scharmer |
| 5,659,725 A | 8/1997 | Levy et al. |
| 5,689,651 A | 11/1997 | Lozman |
| 5,696,907 A | 12/1997 | Tom |
| 5,699,527 A | 12/1997 | Davidson |
| 5,704,029 A | 12/1997 | Wright, Jr. |
| 5,732,400 A | 3/1998 | Mandler |
| 5,774,883 A | 6/1998 | Andersen |
| 5,793,972 A | 8/1998 | Shane |
| 5,802,142 A | 9/1998 | Browne |
| 5,844,218 A | 12/1998 | Kawan et al. |
| 5,857,174 A | 1/1999 | Dugan |
| 5,870,721 A | 2/1999 | Norris |
| 5,875,236 A | 2/1999 | Jankowitz |
| 5,878,403 A | 3/1999 | DeFrancesco |
| 5,884,287 A | 3/1999 | Edesess |
| 5,914,472 A | 6/1999 | Foladare et al. |
| 5,918,217 A | 6/1999 | Maggioncalda et al. |
| 5,924,082 A | 7/1999 | Silverman et al. |
| 5,930,764 A | 7/1999 | Melchione et al. |
| 5,930,776 A | 7/1999 | Dykstra et al. |
| 5,940,812 A | 8/1999 | Tengel et al. |
| 5,950,172 A | 9/1999 | Klingman |
| 5,956,693 A | 9/1999 | Geerlings |
| 5,966,695 A | 10/1999 | Melchione |
| 5,978,780 A | 11/1999 | Watson |
| 5,990,038 A | 11/1999 | Suga et al. |
| 5,995,947 A | 11/1999 | Fraser et al. |
| 6,012,044 A | 1/2000 | Maggioncalda et al. |
| 6,014,645 A | 1/2000 | Cunningham |
| 6,021,397 A | 2/2000 | Jones et al. |
| 6,029,149 A | 2/2000 | Dykstra et al. |
| 6,038,551 A | 3/2000 | Barlow et al. |
| 6,064,987 A | 5/2000 | Walker |
| 6,070,141 A | 5/2000 | Houvener |
| 6,070,147 A | 5/2000 | Harms et al. |
| 6,088,686 A | 7/2000 | Walker et al. |
| 6,094,643 A | 7/2000 | Anderson et al. |
| 6,098,052 A | 8/2000 | Kosiba et al. |
| 6,105,007 A | 8/2000 | Norris |
| 6,115,690 A | 9/2000 | Wong |
| 6,115,694 A | 9/2000 | Cheetham et al. |
| 6,119,103 A | 9/2000 | Basch et al. |
| 6,128,599 A | 10/2000 | Walker |
| 6,128,603 A | 10/2000 | Dent |
| 6,154,729 A | 11/2000 | Cannon et al. |
| 6,182,229 B1 | 1/2001 | Nielsen |
| 6,185,543 B1 | 2/2001 | Galperin et al. |
| 6,202,053 B1 | 3/2001 | Christiansen et al. |
| 6,249,770 B1 | 6/2001 | Erwin et al. |
| 6,253,203 B1 | 6/2001 | O'Flaherty et al. |
| 6,275,824 B1 | 8/2001 | O'Flaherty et al. |
| 6,298,348 B1 | 10/2001 | Eldering |
| 6,304,860 B1 | 10/2001 | Martin et al. |
| 6,311,169 B2 | 10/2001 | Duhon |
| 6,324,524 B1 | 11/2001 | Lent et al. |
| 6,330,575 B1 | 12/2001 | Moore |
| 6,384,844 B1 | 5/2002 | Stewart et al. |
| 6,385,594 B1 | 5/2002 | Lebda et al. |
| 6,397,224 B1 | 5/2002 | Zubeldia et al. |
| 6,405,173 B1 | 6/2002 | Honarvar |
| 6,405,181 B2 * | 6/2002 | Lent ............... G06Q 30/06 705/38 |
| 6,408,282 B1 | 6/2002 | Buist |
| 6,430,539 B1 | 8/2002 | Lazarus et al. |
| 6,532,450 B1 | 3/2003 | Brown et al. |
| 6,567,791 B2 | 5/2003 | Lent et al. |
| 6,611,816 B2 | 8/2003 | Lebda et al. |
| 6,622,131 B1 | 9/2003 | Brown et al. |
| 6,622,266 B1 | 9/2003 | Goddard et al. |
| 6,629,245 B1 | 9/2003 | Stone et al. |
| 6,658,393 B1 | 12/2003 | Basch et al. |
| 6,766,304 B2 | 7/2004 | Kemp et al. |
| 6,772,132 B1 | 8/2004 | Kemp et al. |
| 6,804,346 B1 | 10/2004 | Mewhinney |
| 6,805,287 B2 | 10/2004 | Bishop et al. |
| 6,823,319 B1 | 11/2004 | Lynch et al. |
| 6,839,690 B1 | 1/2005 | Foth et al. |
| 6,873,972 B1 | 3/2005 | Marcial et al. |
| 6,901,406 B2 | 5/2005 | Nabe et al. |
| 6,910,624 B1 | 6/2005 | Natsuno |
| 6,938,011 B1 | 8/2005 | Kemp et al. |
| 6,950,807 B2 | 9/2005 | Brock |
| 6,962,336 B2 | 11/2005 | Glass |
| 6,985,887 B1 | 1/2006 | Sunstein et al. |
| 6,988,085 B2 | 1/2006 | Hedy |
| 6,993,504 B1 | 1/2006 | Friesen et al. |
| 7,016,870 B1 | 3/2006 | Jones et al. |
| 7,028,052 B2 | 4/2006 | Chapman et al. |
| 7,058,817 B1 | 6/2006 | Ellmore |
| 7,062,458 B2 | 6/2006 | Maggioncalda et al. |
| 7,069,249 B2 | 6/2006 | Stolfo et al. |
| 7,076,462 B1 | 7/2006 | Nelson et al. |
| 7,076,475 B2 | 7/2006 | Honarvar |
| 7,120,599 B2 | 10/2006 | Keyes |
| 7,127,424 B2 | 10/2006 | Kemp et al. |
| 7,143,063 B2 | 11/2006 | Lent |
| 7,212,999 B2 | 5/2007 | Friesen et al. |
| 7,228,289 B2 | 6/2007 | Brumfield et al. |
| 7,249,076 B1 | 7/2007 | Pendleton et al. |
| 7,254,558 B2 | 8/2007 | Hinkle et al. |
| 7,263,497 B1 | 8/2007 | Wiser et al. |
| 7,280,980 B1 | 10/2007 | Hoadley et al. |
| 7,280,983 B2 | 10/2007 | Kuroda et al. |
| 7,296,734 B2 | 11/2007 | Pliha |
| 7,302,420 B2 | 11/2007 | Aggarwal et al. |
| 7,314,166 B2 | 1/2008 | Anderson et al. |
| 7,318,224 B2 | 1/2008 | Honarvar et al. |
| 7,333,635 B2 | 2/2008 | Tsantes et al. |
| 7,333,937 B2 | 2/2008 | Baldwin, Jr. et al. |
| 7,337,133 B1 | 2/2008 | Bezos et al. |
| 7,337,468 B2 | 2/2008 | Metzger |
| 7,366,694 B2 | 4/2008 | Lazerson |
| 7,376,603 B1 | 5/2008 | Mayr et al. |
| 7,383,215 B1 | 6/2008 | Navarro et al. |
| 7,383,988 B2 | 6/2008 | Slonecker, Jr. |
| 7,386,466 B2 | 6/2008 | McLean et al. |
| 7,389,268 B1 | 6/2008 | Kemp et al. |
| 7,395,232 B1 | 7/2008 | Pilato |
| 7,403,919 B2 | 7/2008 | Chacko et al. |
| 7,409,369 B1 | 8/2008 | Homuth et al. |
| 7,418,417 B2 | 8/2008 | Chacko et al. |
| 7,451,095 B1 | 11/2008 | Bradley et al. |
| 7,479,949 B2 | 1/2009 | Jobs et al. |
| 7,505,939 B2 | 3/2009 | Lent et al. |
| 7,529,698 B2 | 5/2009 | Joao |
| 7,542,993 B2 | 6/2009 | Satterfield et al. |
| 7,546,266 B2 | 6/2009 | Beirne et al. |
| 7,552,086 B1 | 6/2009 | Rajasekar et al. |
| 7,559,217 B2 | 7/2009 | Bass |
| 7,584,146 B1 | 9/2009 | Duhon |
| 7,593,891 B2 | 9/2009 | Kornegay et al. |
| 7,596,512 B1 | 9/2009 | Raines et al. |
| 7,596,716 B2 | 9/2009 | Frost et al. |
| 7,603,317 B2 | 10/2009 | Adler et al. |

(56) References Cited

U.S. PATENT DOCUMENTS

| | | |
|---|---|---|
| 7,610,229 B1 | 10/2009 | Kornegay |
| 7,620,592 B2 | 11/2009 | O'Mara et al. |
| 7,624,068 B1 | 11/2009 | Heasley et al. |
| 7,630,932 B2 | 12/2009 | Danaher et al. |
| 7,653,592 B1 | 1/2010 | Flaxman et al. |
| 7,653,593 B2 | 1/2010 | Zarikian et al. |
| 7,676,418 B1 | 3/2010 | Chung et al. |
| 7,689,451 B2 | 3/2010 | Vives |
| 7,689,505 B2 | 3/2010 | Kasower |
| 7,711,635 B2 | 5/2010 | Steele et al. |
| 7,711,636 B2 | 5/2010 | Robida et al. |
| 7,720,750 B2 | 5/2010 | Brody et al. |
| 7,729,983 B1 | 6/2010 | Ellis |
| 7,734,522 B2 | 6/2010 | Johnson et al. |
| 7,756,789 B2 | 7/2010 | Welker et al. |
| 7,769,657 B2 | 8/2010 | Chacko et al. |
| 7,774,257 B2 | 8/2010 | Maggioncalda et al. |
| 7,774,270 B1 | 8/2010 | MacCloskey |
| 7,788,147 B2 | 8/2010 | Haggerty et al. |
| 7,788,152 B2 | 8/2010 | Haggerty et al. |
| 7,788,155 B2 | 8/2010 | Jones et al. |
| 7,792,715 B1 | 9/2010 | Kasower |
| 7,792,732 B2 | 9/2010 | Haggerty et al. |
| 7,801,812 B2 | 9/2010 | Conlin et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,836,111 B1 | 11/2010 | Shan |
| 7,840,484 B2 | 11/2010 | Haggerty et al. |
| 7,849,004 B2 | 12/2010 | Choudhuri et al. |
| 7,853,998 B2 | 12/2010 | Blaisdell et al. |
| 7,860,782 B2 | 12/2010 | Cash et al. |
| 7,877,304 B1 | 1/2011 | Coulter |
| 7,890,420 B2 | 2/2011 | Haggerty et al. |
| 7,900,052 B2 | 3/2011 | Joans |
| 7,904,306 B2 | 3/2011 | Johnson et al. |
| 7,904,367 B2 | 3/2011 | Chung et al. |
| 7,912,770 B2 | 3/2011 | Haggerty et al. |
| 7,912,865 B2 | 3/2011 | Akerman et al. |
| 7,925,578 B1 | 4/2011 | Hong et al. |
| 7,925,582 B1 * | 4/2011 | Kornegay ............... G06Q 20/10 705/35 |
| 7,930,252 B2 | 4/2011 | Bender et al. |
| 7,941,365 B1 | 5/2011 | Bradley et al. |
| 7,945,510 B1 | 5/2011 | Bradley et al. |
| 7,966,255 B2 | 6/2011 | Wong et al. |
| 7,970,676 B2 | 6/2011 | Feinstein |
| 7,970,679 B2 | 6/2011 | Kasower |
| 7,970,698 B2 | 6/2011 | Gupta et al. |
| 7,974,919 B2 | 7/2011 | Conlin et al. |
| 7,983,975 B2 | 7/2011 | Jones et al. |
| 7,987,124 B1 | 7/2011 | Holden et al. |
| 8,001,034 B2 | 8/2011 | Chung et al. |
| 8,001,041 B2 | 8/2011 | Hoadley et al. |
| 8,005,738 B2 | 8/2011 | Chacko et al. |
| 8,005,759 B2 | 8/2011 | Hirtenstein et al. |
| 8,005,795 B2 | 8/2011 | Galipeau et al. |
| 8,015,107 B2 | 9/2011 | Kornegay et al. |
| 8,024,263 B2 | 9/2011 | Zarikian et al. |
| 8,032,932 B2 | 10/2011 | Speyer et al. |
| 8,055,579 B2 | 11/2011 | Davies et al. |
| 8,060,424 B2 | 11/2011 | Kasower |
| 8,073,768 B2 | 12/2011 | Haggerty et al. |
| 8,078,524 B2 | 12/2011 | Crawford et al. |
| 8,078,527 B2 | 12/2011 | Cerise et al. |
| 8,086,523 B1 | 12/2011 | Palmer |
| 8,095,458 B2 | 1/2012 | Peterson et al. |
| 8,099,356 B2 | 1/2012 | Feinstein et al. |
| 8,131,614 B2 | 3/2012 | Haggerty et al. |
| 8,160,960 B1 | 4/2012 | Fei et al. |
| 8,165,940 B2 | 4/2012 | Meimes et al. |
| 8,195,549 B2 | 6/2012 | Kasower |
| 8,204,774 B2 | 6/2012 | Chwast et al. |
| 8,204,812 B2 | 6/2012 | Stewart et al. |
| 8,225,395 B2 | 7/2012 | Atwood et al. |
| 8,285,613 B1 | 10/2012 | Coulter |
| 8,290,840 B2 | 10/2012 | Kasower |
| 8,311,936 B2 | 11/2012 | Haggerty et al. |
| 8,315,942 B2 | 11/2012 | Haggerty et al. |
| 8,321,334 B1 | 11/2012 | Kornegay et al. |
| 8,321,339 B2 | 11/2012 | Imrey et al. |
| 8,327,429 B2 | 12/2012 | Speyer et al. |
| 8,335,741 B2 | 12/2012 | Kornegay et al. |
| 8,392,334 B2 | 3/2013 | Hirtenstein et al. |
| 8,489,502 B2 | 7/2013 | Morris et al. |
| 8,515,844 B2 | 8/2013 | Kasower |
| 8,533,118 B2 | 9/2013 | Weller et al. |
| 8,560,161 B1 | 10/2013 | Kator et al. |
| 8,560,436 B2 | 10/2013 | Ingram et al. |
| 8,571,971 B1 | 10/2013 | Brown et al. |
| 8,572,083 B1 | 10/2013 | Snell et al. |
| 8,589,286 B1 | 11/2013 | Kornegay et al. |
| 8,595,101 B1 | 11/2013 | Daukas et al. |
| 8,600,886 B2 | 12/2013 | Ramavarjula et al. |
| 8,606,694 B2 | 12/2013 | Campbell et al. |
| 8,660,919 B2 | 2/2014 | Kasower |
| 8,694,420 B1 | 4/2014 | Oliai |
| 8,732,004 B1 | 5/2014 | Ramos et al. |
| 8,738,516 B1 | 5/2014 | Dean et al. |
| 8,762,243 B2 | 6/2014 | Jenkins et al. |
| 8,781,953 B2 | 7/2014 | Kasower |
| 8,856,894 B1 | 10/2014 | Dean et al. |
| 8,930,263 B1 | 1/2015 | Mahacek et al. |
| 9,053,589 B1 | 6/2015 | Kator et al. |
| 9,053,590 B1 | 6/2015 | Kator et al. |
| 9,058,627 B1 | 6/2015 | Wasser et al. |
| 9,076,276 B1 | 7/2015 | Kator et al. |
| 2001/0011247 A1 | 8/2001 | O'Flaherty et al. |
| 2001/0027413 A1 | 10/2001 | Bhutta |
| 2001/0039523 A1 | 11/2001 | Iwamoto |
| 2001/0042785 A1 | 11/2001 | Walker et al. |
| 2001/0044766 A1 | 11/2001 | Keyes |
| 2001/0049672 A1 | 12/2001 | Moore et al. |
| 2002/0032635 A1 | 3/2002 | Harris et al. |
| 2002/0032645 A1 | 3/2002 | Nozaki et al. |
| 2002/0032647 A1 | 3/2002 | Delinsky et al. |
| 2002/0035511 A1 | 3/2002 | Haji et al. |
| 2002/0035520 A1 | 3/2002 | Weiss |
| 2002/0049624 A1 | 4/2002 | Raveis, Jr. |
| 2002/0052836 A1 | 5/2002 | Galperin et al. |
| 2002/0069122 A1 | 6/2002 | Yun et al. |
| 2002/0073017 A1 | 6/2002 | Robertson |
| 2002/0077964 A1 | 6/2002 | Brody et al. |
| 2002/0091650 A1 | 7/2002 | Ellis |
| 2002/0099641 A1 | 7/2002 | Mills et al. |
| 2002/0099824 A1 | 7/2002 | Bender et al. |
| 2002/0107765 A1 | 8/2002 | Walker |
| 2002/0111890 A1 | 8/2002 | Sloan et al. |
| 2002/0128962 A1 | 9/2002 | Kasower |
| 2002/0147669 A1 | 10/2002 | Taylor et al. |
| 2002/0147695 A1 | 10/2002 | Khedkar et al. |
| 2002/0165757 A1 | 11/2002 | Lisser |
| 2002/0165839 A1 | 11/2002 | Taylor et al. |
| 2002/0169747 A1 | 11/2002 | Chapman et al. |
| 2002/0194117 A1 | 12/2002 | Nabe et al. |
| 2002/0198806 A1 | 12/2002 | Blagg et al. |
| 2002/0198824 A1 | 12/2002 | Cook |
| 2003/0004853 A1 | 1/2003 | Ram et al. |
| 2003/0009411 A1 | 1/2003 | Ram et al. |
| 2003/0009415 A1 | 1/2003 | Lutnick et al. |
| 2003/0009418 A1 | 1/2003 | Green et al. |
| 2003/0018549 A1 | 1/2003 | Fei et al. |
| 2003/0028477 A1 | 2/2003 | Stevenson et al. |
| 2003/0041031 A1 | 2/2003 | Hedy |
| 2003/0046222 A1 | 3/2003 | Bard et al. |
| 2003/0046223 A1 | 3/2003 | Crawford et al. |
| 2003/0065563 A1 | 4/2003 | Elliott et al. |
| 2003/0078897 A1 | 4/2003 | Florance et al. |
| 2003/0115122 A1 | 6/2003 | Slater et al. |
| 2003/0149659 A1 | 8/2003 | Danaher et al. |
| 2003/0154162 A1 | 8/2003 | Danaher et al. |
| 2003/0163435 A1 | 8/2003 | Payone |
| 2003/0195830 A1 | 10/2003 | Merkoulovitch et al. |

(56) References Cited

U.S. PATENT DOCUMENTS

| | | |
|---|---|---|
| 2003/0204752 A1 | 10/2003 | Garrison |
| 2003/0212618 A1 | 11/2003 | Keyes et al. |
| 2003/0229580 A1 | 12/2003 | Gass et al. |
| 2003/0236738 A1 | 12/2003 | Lange et al. |
| 2004/0006536 A1 | 1/2004 | Kawashima et al. |
| 2004/0010458 A1 | 1/2004 | Friedman |
| 2004/0023637 A1 | 2/2004 | Johnson et al. |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0030667 A1 | 2/2004 | Xu et al. |
| 2004/0039688 A1 | 2/2004 | Sulkowski et al. |
| 2004/0044615 A1 | 3/2004 | Xue et al. |
| 2004/0044617 A1 | 3/2004 | Lu |
| 2004/0107132 A1* | 6/2004 | Honarvar ............ G06Q 10/06 706/47 |
| 2004/0111292 A1 | 6/2004 | Hutchins |
| 2004/0111358 A1 | 6/2004 | Lange et al. |
| 2004/0111359 A1 | 6/2004 | Hudock |
| 2004/0111363 A1 | 6/2004 | Trench et al. |
| 2004/0117302 A1 | 6/2004 | Weichert et al. |
| 2004/0133493 A1 | 7/2004 | Ford et al. |
| 2004/0138995 A1 | 7/2004 | Hershkowitz et al. |
| 2004/0143546 A1 | 7/2004 | Wood et al. |
| 2004/0153437 A1 | 8/2004 | Buchan |
| 2004/0158521 A1 | 8/2004 | Newton |
| 2004/0159700 A1 | 8/2004 | Khan et al. |
| 2004/0186807 A1 | 9/2004 | Nathans et al. |
| 2004/0193535 A1 | 9/2004 | Barazesh |
| 2004/0199456 A1 | 10/2004 | Flint et al. |
| 2004/0215584 A1 | 10/2004 | Yao |
| 2004/0243450 A1 | 12/2004 | Bernard, Jr. et al. |
| 2004/0243506 A1 | 12/2004 | Das |
| 2004/0249532 A1 | 12/2004 | Kelly et al. |
| 2004/0255127 A1 | 12/2004 | Arnouse |
| 2005/0004855 A1 | 1/2005 | Jenson et al. |
| 2005/0027633 A1 | 2/2005 | Fortuna et al. |
| 2005/0055275 A1 | 3/2005 | Newman et al. |
| 2005/0080697 A1 | 4/2005 | Foss et al. |
| 2005/0080821 A1 | 4/2005 | Breil et al. |
| 2005/0086126 A1 | 4/2005 | Patterson |
| 2005/0086176 A1 | 4/2005 | Dahlgren |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102226 A1 | 5/2005 | Oppenheimer et al. |
| 2005/0105719 A1 | 5/2005 | Hada |
| 2005/0125291 A1 | 6/2005 | Demkiw Grayson et al. |
| 2005/0125350 A1 | 6/2005 | Tidwell et al. |
| 2005/0130704 A1 | 6/2005 | McParland et al. |
| 2005/0137963 A1 | 6/2005 | Ricketts et al. |
| 2005/0154617 A1 | 7/2005 | Ruggieri et al. |
| 2005/0154664 A1 | 7/2005 | Guy et al. |
| 2005/0154769 A1 | 7/2005 | Eckart et al. |
| 2005/0159996 A1 | 7/2005 | Lazarus et al. |
| 2005/0267840 A1 | 12/2005 | Holm-Blagg et al. |
| 2005/0273431 A1 | 12/2005 | Abel et al. |
| 2005/0283415 A1 | 12/2005 | Studnitzer et al. |
| 2006/0014129 A1 | 1/2006 | Coleman et al. |
| 2006/0031158 A1 | 2/2006 | Orman |
| 2006/0059073 A1 | 3/2006 | Walzak |
| 2006/0059083 A1 | 3/2006 | Friesen et al. |
| 2006/0080251 A1 | 4/2006 | Fried et al. |
| 2006/0095363 A1 | 5/2006 | May |
| 2006/0100954 A1 | 5/2006 | Schoen |
| 2006/0123461 A1 | 6/2006 | Lunt et al. |
| 2006/0155639 A1 | 7/2006 | Lynch et al. |
| 2006/0163347 A1 | 7/2006 | Foss et al. |
| 2006/0173772 A1 | 8/2006 | Hayes et al. |
| 2006/0178971 A1 | 8/2006 | Owen et al. |
| 2006/0178983 A1 | 8/2006 | Nice et al. |
| 2006/0184410 A1 | 8/2006 | Ramamurthy et al. |
| 2006/0200396 A1 | 9/2006 | Satterfield et al. |
| 2006/0212386 A1 | 9/2006 | Willey et al. |
| 2006/0229799 A1 | 10/2006 | Nimmo et al. |
| 2006/0233332 A1 | 10/2006 | Toms |
| 2006/0242039 A1 | 10/2006 | Haggerty et al. |
| 2006/0242049 A1 | 10/2006 | Haggerty et al. |
| 2006/0242051 A1 | 10/2006 | Haggerty et al. |
| 2006/0259364 A1 | 11/2006 | Strock et al. |
| 2006/0265323 A1 | 11/2006 | Winter et al. |
| 2006/0271633 A1 | 11/2006 | Adler |
| 2006/0287764 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0294199 A1 | 12/2006 | Bertholf |
| 2007/0016500 A1 | 1/2007 | Chatterji et al. |
| 2007/0016501 A1 | 1/2007 | Chatterji et al. |
| 2007/0016518 A1 | 1/2007 | Atkinson et al. |
| 2007/0038568 A1 | 2/2007 | Greene et al. |
| 2007/0067206 A1 | 3/2007 | Haggerty et al. |
| 2007/0078741 A1 | 4/2007 | Haggerty et al. |
| 2007/0083463 A1 | 4/2007 | Kraft |
| 2007/0100719 A1 | 5/2007 | Chwast et al. |
| 2007/0112668 A1 | 5/2007 | Celano et al. |
| 2007/0156718 A1 | 7/2007 | Hossfeld et al. |
| 2007/0168267 A1 | 7/2007 | Zimmerman et al. |
| 2007/0179798 A1 | 8/2007 | Inbarajan |
| 2007/0208640 A1 | 9/2007 | Banasiak et al. |
| 2007/0214000 A1 | 9/2007 | Shahrabi et al. |
| 2007/0226093 A1 | 9/2007 | Chan et al. |
| 2007/0226114 A1 | 9/2007 | Haggerty et al. |
| 2007/0233591 A1 | 10/2007 | Newton |
| 2007/0244732 A1 | 10/2007 | Chatterji et al. |
| 2007/0260539 A1 | 11/2007 | Delinsky |
| 2007/0266439 A1 | 11/2007 | Kraft |
| 2007/0282736 A1 | 12/2007 | Conlin et al. |
| 2007/0288338 A1 | 12/2007 | Hoadley |
| 2007/0299770 A1 | 12/2007 | Delinsky |
| 2007/0299771 A1 | 12/2007 | Brody |
| 2008/0010203 A1 | 1/2008 | Grant |
| 2008/0059364 A1 | 3/2008 | Tidwell et al. |
| 2008/0109740 A1 | 5/2008 | Prinsen et al. |
| 2008/0133322 A1 | 6/2008 | Kalia et al. |
| 2008/0140507 A1 | 6/2008 | Hamlisch et al. |
| 2008/0154766 A1 | 6/2008 | Lewis et al. |
| 2008/0162383 A1 | 7/2008 | Kraft |
| 2008/0172324 A1 | 7/2008 | Johnson |
| 2008/0177655 A1 | 7/2008 | Zalik |
| 2008/0195548 A1 | 8/2008 | Chu et al. |
| 2008/0201257 A1 | 8/2008 | Lewis et al. |
| 2008/0222015 A1 | 9/2008 | Megdal et al. |
| 2008/0222027 A1 | 9/2008 | Megdal et al. |
| 2008/0222706 A1 | 9/2008 | Renaud et al. |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0312969 A1 | 12/2008 | Raines et al. |
| 2009/0007231 A1 | 1/2009 | Kaiser et al. |
| 2009/0012889 A1 | 1/2009 | Finch |
| 2009/0055322 A1 | 2/2009 | Bykov et al. |
| 2009/0063330 A1 | 3/2009 | Cerise |
| 2009/0089190 A1 | 4/2009 | Girulat |
| 2009/0099960 A1 | 4/2009 | Robida et al. |
| 2009/0106846 A1 | 4/2009 | Dupray et al. |
| 2009/0119199 A1 | 5/2009 | Salahi |
| 2009/0119299 A1 | 5/2009 | Rhodes |
| 2009/0126013 A1 | 5/2009 | Atwood et al. |
| 2009/0132347 A1 | 5/2009 | Anderson et al. |
| 2009/0144160 A1 | 6/2009 | Haggerty et al. |
| 2009/0144185 A1 | 6/2009 | Haggerty et al. |
| 2009/0158030 A1 | 6/2009 | Rasti |
| 2009/0171723 A1 | 7/2009 | Jenkins |
| 2009/0210886 A1 | 8/2009 | Bhojwani et al. |
| 2009/0222379 A1 | 9/2009 | Choudhuri et al. |
| 2009/0240624 A1 | 9/2009 | James et al. |
| 2009/0271248 A1 | 10/2009 | Sherman et al. |
| 2009/0289110 A1 | 11/2009 | Regen et al. |
| 2009/0327120 A1 | 12/2009 | Eze et al. |
| 2010/0009320 A1 | 1/2010 | Wilkelis |
| 2010/0010935 A1 | 1/2010 | Shelton |
| 2010/0023434 A1 | 1/2010 | Bond |
| 2010/0082476 A1 | 4/2010 | Bowman |

(56) References Cited

U.S. PATENT DOCUMENTS

| | | | |
|---|---|---|---|
| 2010/0114744 A1 | 5/2010 | Gonen |
| 2010/0121767 A1 | 5/2010 | Coulter et al. |
| 2010/0145840 A1 | 6/2010 | Kasower |
| 2010/0169209 A1 | 7/2010 | Kornegay et al. |
| 2010/0174638 A1 | 7/2010 | Debie et al. |
| 2010/0223168 A1 | 9/2010 | Haggerty et al. |
| 2010/0228658 A1 | 9/2010 | Ketelsen et al. |
| 2010/0253686 A1 | 10/2010 | Alsbury et al. |
| 2010/0257102 A1 | 10/2010 | Perlman |
| 2010/0268660 A1 | 10/2010 | Ekdahl |
| 2010/0299251 A1 | 11/2010 | Thomas |
| 2010/0299252 A1 | 11/2010 | Thomas |
| 2010/0299260 A1 | 11/2010 | Thomas |
| 2010/0324986 A1 | 12/2010 | Thomas |
| 2010/0325036 A1 | 12/2010 | Thomas |
| 2011/0004514 A1 | 1/2011 | Thomas |
| 2011/0004546 A1 | 1/2011 | Thomas |
| 2011/0029427 A1 | 2/2011 | Haggerty et al. |
| 2011/0060654 A1 | 3/2011 | Elliott et al. |
| 2011/0060673 A1 | 3/2011 | Delinsky et al. |
| 2011/0112950 A1 | 5/2011 | Haggerty et al. |
| 2011/0166988 A1 | 7/2011 | Coulter |
| 2011/0178841 A1 | 7/2011 | Rane et al. |
| 2011/0178899 A1 | 7/2011 | Huszar |
| 2011/0282779 A1 | 11/2011 | Megdal et al. |
| 2011/0295733 A1 | 12/2011 | Megdal et al. |
| 2012/0005070 A1 | 1/2012 | McFall et al. |
| 2012/0054090 A1 | 3/2012 | Haggerty et al. |
| 2012/0066106 A1* | 3/2012 | Papadimitriou ....... G06Q 40/00 705/35 |
| 2012/0101938 A1 | 4/2012 | Kasower |
| 2012/0101939 A1 | 4/2012 | Kasower |
| 2012/0116951 A1 | 5/2012 | Chung et al. |
| 2012/0123931 A1 | 5/2012 | Megdal et al. |
| 2012/0136774 A1 | 5/2012 | Imrey et al. |
| 2012/0253852 A1 | 10/2012 | Pourfallah et al. |
| 2012/0265661 A1 | 10/2012 | Megdal et al. |
| 2012/0278767 A1 | 11/2012 | Stibel et al. |
| 2012/0324388 A1 | 12/2012 | Rao et al. |
| 2013/0006825 A1 | 1/2013 | Robida et al. |
| 2013/0103571 A1 | 4/2013 | Chung et al. |
| 2013/0110565 A1 | 5/2013 | Means et al. |
| 2013/0117087 A1 | 5/2013 | Coppinger |
| 2013/0173451 A1 | 7/2013 | Kornegay et al. |
| 2013/0173481 A1 | 7/2013 | Hirtenstein et al. |
| 2013/0205135 A1 | 8/2013 | Lutz |
| 2013/0332338 A1 | 12/2013 | Yan et al. |
| 2013/0332341 A1 | 12/2013 | Papadimitriou |
| 2013/0339249 A1 | 12/2013 | Weller et al. |
| 2014/0012734 A1 | 1/2014 | Megdal et al. |
| 2014/0032300 A1 | 1/2014 | Zhang et al. |
| 2014/0032723 A1 | 1/2014 | Nema |
| 2014/0061302 A1 | 3/2014 | Hammad |
| 2014/0110477 A1 | 4/2014 | Hammad |
| 2014/0156501 A1 | 6/2014 | Howe |
| 2014/0258089 A1 | 9/2014 | Pearson et al. |
| 2014/0279329 A1 | 9/2014 | Dancel |
| 2015/0026014 A1 | 1/2015 | Kasower |
| 2015/0228016 A1 | 8/2015 | Chandler |

FOREIGN PATENT DOCUMENTS

| | | |
|---|---|---|
| EP | 0 566 736 | 8/1993 |
| EP | 0 869 652 | 10/1998 |
| EP | 0 913 789 | 5/1999 |
| EP | 0 919 942 | 6/1999 |
| EP | 1 028 401 | 8/2000 |
| JP | 2001-282957 | 10/2001 |
| JP | 2002-163449 | 6/2002 |
| JP | 2003-016261 | 1/2003 |
| JP | 2003-316950 | 11/2003 |
| WO | WO 99/46710 | 9/1999 |
| WO | WO 00/011574 | 3/2000 |
| WO | WO 01/16896 | 3/2001 |
| WO | WO 01/39090 | 5/2001 |
| WO | WO 01/039589 | 6/2001 |
| WO | WO 01/041083 | 6/2001 |
| WO | WO 01/041355 | 6/2001 |
| WO | WO 01/057720 | 8/2001 |
| WO | WO 01/80053 | 10/2001 |
| WO | WO 01/084281 | 11/2001 |
| WO | WO 2004/114160 | 12/2004 |
| WO | WO 2005/022348 | 3/2005 |
| WO | WO 2005/124619 | 12/2005 |
| WO | WO 2006/099492 | 9/2006 |
| WO | WO 2006/135451 | 12/2006 |
| WO | WO 2007/004158 | 1/2007 |
| WO | WO 2007/106393 | 9/2007 |
| WO | WO 2007/106786 | 9/2007 |
| WO | WO 2007/106787 | 9/2007 |
| WO | WO 2009/061342 | 5/2009 |
| WO | WO 2009/064840 | 5/2009 |
| WO | WO 2009/099448 | 8/2009 |

OTHER PUBLICATIONS

"Equifax and FICO Serve Consumers", Mar. 2001.
Ettore, Paul Kahn on Exceptional Marketing. Management Review, vol. 38(11), Nov. 1994, pp. 48-51.
Experian Announces PLUS Score; Experian Press Release dated Oct. 16, 2003; Experian Global Press Office.
Fair Isaac Corporation, myFICO: Calculators: Credit Assessment, [online] [retrieved on Jun. 8, 2005] Retrieved from the internet <URL: http://www.myfico.com/CreditEducation/Calculators/CreditAssessment.aspx>, 2005.
Fair Isaac Corporation, myFICO: Help: FICO Score Simulator, [online] [retrieved on Jun. 8, 2005] Retrieved from the internet <URL: http://www.myfico.com/Help/Simulator.aspx?fire=5>, 2005.
Fair Isaac Corporation, myFICO: Products: Suze Orman's FICO Kit Platinum, [online] [retrieved on Jun. 8, 2005] Retrieved from the internet <URL: http://www.myfico.com/Products/FICOKit/Description.aspx>, 2005.
Fair Isaac Corporation, myFICO: Products: Suze Orman's FICO® Kit Platinum: FICO Score Check, [online] [retrieved on Jun. 7, 2005] Retrieved from the internet <URL: http://www.myfico.com/Products/FICOKit/Sample03.html>, 2005.
Fair Isaac Corporation, myFICO: Sample: FICO Score Simulator: "Max Out" Your Credit Cards, [online] [retrieved on Jun. 8, 2005] Retrieved from the internet <URL: http://www.myfico.com/Content/Samples/Sample_ScoreSimulatorResults.asp?Simulation=4 & ReportID.
Fair Isaac Corporation, myFICO: Sample: FICO Score Simulator: Miss Payments, [online] [retrieved on Jun. 8, 2005] Retrieved from the internet <URL: http://www.myfico.com/Content/Samples/Sample_ScoreSimulatorResults.asp?miss_payment=radiobutton& Simulation=.
Fair Isaac Corporation, myFICO: Sample: FICO Score Simulator: Pay Down Delinquent Balances First, [online] [retrieved on Jun. 8, 2005] Retrieved from the internet <URL: http://www.myfico.com/Content/Samples/Sample_ScoreSimulatorResults.asp?textfieldC C=750.
Fair Isaac Corporation, myFICO: Sample: FICO Score Simulator: Suggested Best Action, [online] [retrieved on Jun. 8, 2005] Retrieved from the internet <URL: http://www.myfico.com/Content/Samples/Sample_ScoreSimulatorResults.asp?Simulation=111&ReportID=1&Pr.
Ideon, Credit-Card Registry that Bellyflopped this Year, is Drawing some Bottom-Fishers, The Wall Street Journal, Aug. 21, 1995, pp. C2.
"Impac Funding Introduces Enhanced Website for Static Pool Tracking of MBS Transactions," Walthham, MA; Webpage printed out from <http://www.lewtan.com/press/1208044_Impac-Lewtan.htm> on Mar. 20, 2008.
"JPMorgan Worldwide Securities Services to Acquire Paloma's Middle and Back Office Operations," Webpage printed from <http://www.jpmorgan.com> on Apr. 1, 2009.

(56) References Cited

OTHER PUBLICATIONS

Lee, W.A., "Experian Eyes Payments, Mulls Deals" American Banker: The Financial Services Daily, 2pgs., New York, NY, May 30, 2003.
Lee, W.A., "Money, Quicken, and the Value of Alliances", American Banker: The Financial Services Daily, 2pgs., New York, NY, Jul. 28, 2003.
Powerforms: Declarative Client-Side for Field Validation, ISSN 1386-145x, Dec. 2000.
Singletary, Michelle "Ratings for the Credit Raters", The Washington Post, The Color of Money column, Mar. 24, 2002 in 1 page.
Singletary, Michelle, "Score One for Open Credit Ratings." The Washington Post, Washington DC, Jun. 18, 2000, 3 pages.
Stanton, T.H. "Credit Scoring and Loan Scoring as Tools for Improved Management of Federal Credit Programs." Financier, Philadelphia, Summer 1999, vol. 6, 36 pages.
Stein, Benchmarking Default Prediction Models: Pitfalls and Remedies in Model Validation, Moody's KMV, Revised Jun. 13, 2002, Technical Report #020305; New York.
Watts, Craig, "Consumers Now Can Know What Loan Rate Offers to Expect Based on Their FICO Credit Score at MyFICO.com", Mar. 6, 2002, (http://www.myfico.com/PressRoom/PressReleases/2002_03_06.aspx).
Watts, Craig, "Fair, Isaac and Equifax Give Consumers New Score Power Tools Offering Greater Insights for Managing Their Credit Health", May 21, 2002, (http://www.myfico.com/PressRoom/PressReleases/2002_05_21.aspx).
Webpage printed from <http://www.magnum.net/pdfs/RapUpBrochure.pdf.> on Mar. 4, 2008.
Yücesan et al., "Distributed web-based simulation experiments for optimization", Simulation Practice and Theory 9 (2001), pp. 73-90.
Zimmerman et al., "A web-based platform for experimental investigation of electric power auctions", Decision Support Systems 24 (1999), pp. 193-205.
Zoot—Instant Rules GUI, <www.zootweb.com/instant_rules_GUI.html> as printed Mar. 3, 2008.
Zoot—Rules Management GUI, <www.zootweb.com/business_rules_GUI.html> as printed Mar. 3, 2008.
International Preliminary Report on Patentability for Application No. PCT/US2005/041814 mailed Aug. 29, 2007 in 8 pages.
PCT Form IB/326 with International Preliminary Report and Written Opinion with International Search Report for Appl. No. PCT/US05/041814 mailed Aug. 29, 2007 in 8 pages.
Jan. 14, 2009—Examiner Summary of Interview in U.S. Appl. No. 10/452,155.
Jan. 20, 2006—Office Action in U.S. Appl. No. 09/790,453.
Jan. 22, 2008—Office Action Response in U.S. Appl. No. 10/183,135.
Jan. 25, 2008—Office Action in U.S. Appl. No. 10/452,155.
Jan. 3, 2008—Office Action Response in U.S. Appl. No. 09/790,453.
Oct. 2, 2008—Office Action in U.S. Appl. No. 10/452,155.
Oct. 22, 2007—Office Action in U.S. Appl. No. 10/183,135.
Nov. 8, 2007—Office Action Response in U.S. Appl. No. 09/790,453.
Dec. 1, 2006—Office Action in U.S. Appl. No. 09/790,453.
Dec. 22, 2008—Office Action Response in U.S. Appl. No. 10/183,135.
Dec. 26, 2008—Office Action in U.S. Appl. No. 11/363,984.
Feb. 26, 2009—Office Action in U.S. Appl. No. 10/183,135.
Mar. 1, 2007—Office Action Response in U.S. Appl. No. 09/790,453.
Mar. 21, 2008—Office Action in U.S. Appl. No. 09/790,453.
Apr. 14, 2008—Office Action in U.S. Appl. No. 10/183,135.
Apr. 2, 2009—Office Action Response in U.S. Appl. No. 10/452,155.
Apr. 20, 2006—Office Action Response in U.S. Appl. No. 09/790,453.
May 10, 2007—Office Action Response in U.S. Appl. No. 09/790,453.
Jun. 11, 2008—Office Action Response in U.S. Appl. No. 10/183,135.
Jun. 3, 2008—Office Action Response in U.S. Appl. No. 09/790,453.
Jul. 11, 2006—Office Action in U.S. Appl. No. 09/790,453.
Jul. 23, 2008—Examiner Summary of Interview in U.S. Appl. No. 10/452,155.
Jul. 25, 2008—Office Action Response in U.S. Appl. No. 10/452,155.
Aug. 21, 2008—Office Action in U.S. Appl. No. 10/183,135.
Sep. 15, 2003—Preliminary Amendment in U.S. Appl. No. 10/452,155.
Sep. 8, 2006—Office Action Response in U.S. Appl. No. 09/790,453.
Office Action from U.S. Appl. No. 11/169,769 dated Mar. 24, 2010 (017A2CP4 counterpart).
U.S. Appl. No. 09/790,453, filed Feb. 22, 2001 and published Oct. 7, 2004 as U.S. Patent Application Publication No. US 2004-0199456.
U.S. Appl. No. 10/183,135, filed Jun. 25, 2002 and published Mar. 6, 2003 as U.S. Patent Application Publication No. US 2003-0046223.
U.S. Appl. No. 10/452,155, filed May 30, 2003.
U.S. Appl. No. 11/363,984, filed Feb. 27, 2006 and published Sep. 28, 2006 as U.S. Patent Application Publication No. US 2006-0218067.
Avery et al., "Consumer Credit Scoring: Do Situational Circumstances Matter?", Journal of Banking & Finance, vol. 28, 2004, pp. 835-856.
CreditAnalyst, Digital Matrix Systems, as printed out Mar. 4, 2008, pp. 2.
CreditToolkit, Digital Matrix Systems, as printed out Mar. 4, 2008, pp. 2.
CreditXpert, http://www.creditxpert.com/Products/individuals.asp printed Oct. 12, 2012 in 1 page.
Credit Plus, Inc.; "Score Wizard" [online] [retrieved on Jun. 13, 2007] Retrieved from the internet http://web.archive.org/web/20030806080310/www.creditplus.com/scorewizard.asp Nov. 27, 2002 & Mar. 23, 2003.
CreditXpert Inc., CreditXpert 3-Bureau Comparison™, [online] [retrieved on Jun. 7, 2005] Retrieved from the internet http://www.creditxpert.com/CreditXpert%203-Bureau%20Comparison(TM)%20sample.pdf, 2002.
CreditXpert Inc., CreditXpert Credit Score & Analysis, [online] [retrieved on Jun. 7, 2005] Retrieved from the internet http://www.creditxpert.com/CreditXpert%20Score%20&%20Analysis%20and%20Credit%20Wizard%20sample.pdf, 2002.
CreditXpert Inc., CreditXpert Essentials™, Advisor View-Experian Jul. 7, 2003, [online] [retrieved on Nov. 29, 2004] Retrieved from the internet http://www.creditxpert.com/cx_ess_app.pdf, 2004., Issue Wallace.
CreditXpert Inc., CreditXpert Essentials™, Advisor View-TransUnion, [online] [retrieved on Jun. 7, 2005] Retrieved from the internet http://www.creditxpert.com/cx_ess_app.pdf, 2004., Issue Wallace.
CreditXpert Inc., CreditXpert Essentials™, Applicant View, [online] [retrieved on Jun. 7, 2005] Retrieved from the internet http://www.creditxpert.com/cx_ess_app.pdf, 2004.
CreditXpert Inc., CreditXpert What-If Simulator™, [online] [retrieved on Jun. 7, 2005] Retrieved from the internet http://www.creditxpert.com/CreditXpert%20What-If%20Simulator(TM)%20sample.pdf, 2002.
Demby, Elayne, "Special Report: Letting Consumers Know the Score—and More", Collections and Credit Risk, New York, Feb. 2003, vol. 8, Issue 2, p. 53, pp. 3.
Experian-Scorex Announces New Credit Simulation Tool, PR Newswire, Costa Mesa, CA, Jun. 13, 2005.
Fisher, Joseph, "Access to Fair Credit Reports: Current Practices and Propsed Legislation," American Business Law Journal, Fall 1981, vol. 19, No. 3., p. 319.

(56) References Cited

OTHER PUBLICATIONS

Instant Access to Credit Reports Now Available Online with DMS' CreditBrowser-based system also Simplifies Credit Decisioning and Offers a Central Point of Control, Business Wire, p. 0264, Dallas, May 23, 2000.
"Judging Credit: Consumers Need Better Finance Tools", News Journal, Daytona Beach, FL, Dec. 28, 2002.
Lee, W.A.; "Fair Isaac Taps Institutions for Credit Score Distribution", American Banker: The Financial Services Daily, New York, NY, Apr. 9, 2002, vol. 167, Issue 67, 1 Page.
Miller, Margaret, "Credit Reporting Systems Around the Globe: The State of the Art in Public and Private Credit Registries", Jun. 2000, pp. 32, http://siteresources.worldbank.org/INTRES/Resources/469232-1107449512766/Credit_Reporting_Systems_Around_The_Globe.pdf.
Occasional CF Newsletter; http://www.halhelms.com/index.cfm?fuseaction=newsletters.oct1999, Oct. 1999.
Partnoy, Frank, Rethinking Regulation of Credit Rating Agencies: An Institutional Investor Perspective, Council of Institutional Investors, Apr. 2009, pp. 21.
West, David, "Neural Network Credit Scoring Models", Computers & Operations Research, vol. 27, 2000, pp. 1131-1152.
CISCO: What-If Simulator, http://www.ciscocredit.com/whatifsim.html printed Oct. 12, 2012 in 2 pages.
CISCO: Your Mortgage Credit Reporting Specialists, http://www.ciscocredit.com/cc_Services.html#what printed Oct. 12, 2012 in 4 pages.
CreditKarma: How Credit Karma Works, http://www.creditkarma.com/help/howitworksprinted Oct. 12, 2012 in 2 pages.
Credit Source Online: The Secrets of Raising Your Credit Score, http://www.creditsourceonline.com/secrets-of-raising-your-credit-score.html printed Oct. 12, 2012 in 4 pages.
Ecredable: Discover your AMP Credit Rating™, http://www.ecredable.com/how-it-works/amp-credit-rating printed Oct. 12, 2012 in 2 pages.
Equifax: Consumer Bureau, http://www.equifax.co.in/financial-services/consumer_bureau/en_in#RiskScore printed Oct. 12, 2012 in 3 pages.
Experian, http://www.experian.com/ printed Oct. 12, 2012 in 1 page.
Financial Engines, http://corp.financialengines.com/ printed Oct. 12, 2012 in 1 page.
MyFico, http://www.myfico.com/products/ficoone/sannple/sannple_scoresimulator.aspx printed Oct. 12, 2012 in 3 pages.
TransUnion: VantageScore®—Consistency in Credit Scoring, http://www.transunion.com/personal-credit/credit-reports/vantage-score.page printed Oct. 12, 2012 in 2 pages.
Application as filed in U.S. Appl. No. 09/653,595, dated Aug. 31, 2000.
eFunds Introduces QualiFileSM, Deluxe Corporation, eFunds Press Release and Product Launch, Sep. 23, 1999, Milwaukee, WI.
Experian, Custom Strategist and Qualifile from Funds, 2000, in 2 pages.
Provisional Application as filed in U.S. Appl. No. 60/168,272, dated Dec. 1, 1999 in 14 pages.
Provisional Application as filed in U.S. Appl. No. 60/168,276, dated Dec. 1, 1999 in 82 pages.
Provisional Application as filed in U.S. Appl. No. 60/213,367, dated Jun. 23, 2000 in 20 pages.
Zoot—Zoot's Hosted Environment, http://www.zootweb.com/zootasp.html as printed Mar. 3, 2008.
Abrahams, Steven W., "The New View in Mortgage Prepayments: Insight from Analysis at the Loan-By-Loan Level," The Journal of Fixed Income, Jun. 1997, vol. 7, No. 1, pp. 8-21.
AISG's National Underwriting Database, A-PLUS, is Now the Largest in the Industry, Business Wire, Aug. 7, 1997.
"AT&T Expected to Turn Up Heat in Card Wars", American Banker, May 27, 1993, vol. 158, No. 101, pp. 3.

Awoonor-Williams, Princess Josephine, Ph.D. "Gender and Credit: An Analysis of Women's Experience in the Credit Market", ProQuest Dissertations and Theses, 2004, pp. 148.
"Balance Transfers Offer Opportunities", Risk Credit Risk Management Report, Jan. 29, 1996, vol. 6, No. 2, pp. 2.
Bancroft, John, "Tools Help Managers with Risk Management," Real Estate Finance Today, May 26, 1997, pp. 11-12.
"Bank of America Direct Web-Based Network Adds Core Functionality to Meet Day-To-Day Treasury Needs", Business Wire, Oct. 25, 1999, pp. 2.
Barone, Robert P., "The Integrated Approach to Branch Service Delivery," American Banker, Aug. 6, 1991, http://www.highbeam.com/doc/1G1-11128400.html.
Bilotta, Caryn, "Understanding Credit Scores," Pittsburgh Post—Gazette, May 9, 2010.
Brown et al., "ALCOD IDSS:Assisting the Australian Stock Market Surveillance Team's Review Process," Applied Artificial Intelligence Journal, Dec. 1, 1996, pp. 625-641.
Cantor, R. and Packer, F., "The Credit Rating Industry," FRBNY Quarterly Review, Summer-Fall, 1994, pp. 1-24.
"Chase Gets Positive," Bank Technology News, May 6, 2000, vol. 14, No. 5, p. 33.
Chatterjee et al., "Expenditure Patterns and Aggregate Consumer Behavior, Some Experiments with Australian and New Zealand Data", The Economic Record, vol. 70, No. 210, Sep. 1994, pp. 278-291.
Chores & Allowances, "Do Kids Have Credit Reports?" Oct. 15, 2007, http://choresandallowances.blogspot.corn/2007/10/do-kids-have-credit-reports.html, pp. 5.
"Cole Taylor Bank Chooses Integrated E-Banking/E-Payments/Reconciliation Solution From Fundtech", Business Wire, Oct. 21, 1999, pp. 2.
"Credit Information Bureaus and 'CIBIL'", http://www.icicibank.com/cibil.html printed Aug. 22, 2012 in 3 pages.
comScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.
Consumer Reports, "Consumer Reports Finds American-Made Vehicles Close Reliability Gap with European-Made Vehicles—as Japanese Continue to Set New Benchmarks for the Industry", http://www.consumerreports.org/content/Pressroom/Presseng/PDF/eng0304rel.pdf, Apr. 2003, pp. 2.
Credit Card Management, "Neural Nets Shoot for Jackpot," Dec. 1995, pp. 1-6.
Credit Risk Management Report, Potomac, Mar. 9, 1998, vol. 8, No. 4.
Dash, Julekha, "Java on the Street," Software Magazine, Oct. 1, 1997, vol. 17, No. 11, p. 2.
Dataman Group, "Summarized Credit Statistics," Aug. 22, 2001, http://web.archive.org/web/20010822113446/http://www.datamandroup.com/summarized_credit.asp.
David, Alexander, "Controlling Information Premia by Repackaging Asset-Backed Securities," The Journal of Risk and Insurance, Dec. 1997, 26 pages.
Davis, Lisa, "Safety in Numbers," Business North Carolina, Sep. 1, 1995, vol. 15, No. 9, p. 24.
"Debt Settlement: Watch Video on how to Pay Your Debt Faster", http://www.debtconsolidationcare.com/debt-settlement.html printed Jan. 9, 2013 in 6 pages.
Department of Real Estate, http://web.archive.org/web/20040619190012/http://www.dre.ca.gov/pubs_sub.htm, Jun. 19, 2004, in 5 pages.
Department of Real Estate, "Reference Book," http://web.archive.org/web/20041011063158/http://www.dre.ca.gov/pdf_docs/ref17.pdf, Jun. 18, 2004, Chapter 17, pp. 311-382.
Dillon et al., "Good Science", Marketing Research: A Magazine of Management & Applications™, Winter 1997, vol. 9, No. 4; pp. 11.
Downing, Jr.; Richard, "Changes to the Credit Reporting Act," Mortgage Banking, Apr. 1, 1998, vol. 58, No. 7, pp. 82-85.
"Experian Launches Portfolio Monitor—Owner NoticesSM", News Release, Feb. 2003, Costa Mesa, CA.

(56) References Cited

OTHER PUBLICATIONS

Experian Information Solutions, Inc., Credit Trends: Access Credit Trending Information Instantly, http://kewaneecreditbureau.com/Credit.Trends.pdf, Aug. 2000, pp. 4.
Fair Isaac Announces Integrated, End-to-End Collection and Recovery Solution, Business Wire, New York, Sep. 2, 2004, p. 1.
Fair Isaac Corporation, myFICO: Products: Suze Orman's FICO®. Kit Platinum: Look for Errors, as printed Jun. 7, 2005 in 3 pages http://www.myfico.com/Products/FICOKit/Sample02.html.
Fair Isaac Corporation, myFICO: Products:Suze Orman's FICO® Kit Platinum: Your FICO Score, as printed Jun. 7, 2005 in 1 page, http://www.mvfico.com/Products/FICOKit/Sample01.html.
Fair Isaac Corporation, myFICO: Sample: FICO Score Simulator, as printed Jun. 8, 2005 in 5 pages, http://www.myfico.com/Content/Samples/Sample_ScoreSimulator.asp.
Fair Isaac Corporation, myFICO: Sample: FICO Score Simulator: Pay Down the Balances on All Your Credit Cards, as printed Jun. 8, 2005 in 2 pages, http://www.myfico.com/Content/Samples/Sample_ScoreSimulatorResults.asp?textfieldCC1=750&Select Months=1&PayOption=radiobutton&textfieldCC=750&Simulation=3&ReportID=1&ProductID=&Execute.x=57&Execute.y=22.
Fair Isaac Corporation, myFICO: Sample: FICO Score Simulator: Pay Your Bills on Time, as printed Jun. 8, 2005 in 2 pages, http://www.myfico.com/Content/Samples/Sample.ScoreSimulatorResults.asp?select1=1&Simulation=1&ReportID=1&ProductID=&PayBillsOnTime.x=93&PayBillsOnTime.y=23.
Fair Isaac Corporation, myFICO: Sample: FICO Score Simulator: Seek New Credit, as printed Jun. 8, 2005 in 2 pages, http://www.myfico.com/Content/Samples/Sample_ScoreSimulatorResults.asp?new_credit=radiobutton&textfield5A=3000&tectfield5B=&textfield5C=&Simulation=5&ReportID=1&ProductID=&NewCredit.x=62&NewCredit.y=20.
Fair Isaac Corporation, myFICO: Sample: FICO Score Simulator: Transfer Credit Card Balances, as printed Jun. 8, 2005 in 2 pages, http://www.myfico.com/Content/Samples/Sample_ScoreSimulatorResults.asp?textfield222=5000&Simulation=6&ReportID=1&ProductID=&TransferBalance.x=86&TransferBalance.y=24.
FamilySecure.com;"Identity Theft Protection for the Whole Family | FamilySecure.com" http://www.familysecure.com/, as retrieved on Nov. 5, 2009.
Fickenscher, Lisa, "Merchant American Express Seeks to Mine its Data on Cardholder Spending Patterns," American Banker, vol. 162, Issue 56, Mar. 24, 1997, pp. 1-2.
Forrest, David, "Achieving Perfect Credit—Lesson 3: Assessing Your Situation," http://www.fool.com/seminars/ev/index.htm?sid=0029&lid=300, 2002, copyright 1995-2002, in 7 pages.
Frank, John, "Scoring Takes on a New Meaning," Credit Card Management, Sep. 1996, vol. 9, No. 6, pp. 155-159.
"FTC Testifies: Identity Theft on the Rise", FTC News Release, Mar. 7, 2000, pp. 3.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
GAO-03-661, Best Practices: Improved Knowledge of DOD Service Contracts Could Reveal Significant Savings, GAO, Jun. 2003.
Gibbs, Adrienne; "Protecting Your Children from Identity Theft," Nov. 25, 2008, http://www.creditcards.com/credit-card-news/identity-ID-theft-and-kids-children-1282.php, pp. 4.
Gilje, Shelby, "Keeping Tabs on Businesses That Keep Tabs on Us", NewsRoom, The Seattle Times, Section: Scene, Apr. 19, 1995, pp. 4.
Giudici, Paolo, "Bayesian Data Mining, with Application to Benchmarking and Credit Scoring," Applied Stochastic Models in Business and Industry, 2001, vol. 17, pp. 69-81.
"Green Tree Investors May Go to Court," Mar. 4, 1998, http://web.archive.org/web/20001101080021/http://www.channel4000.com/news/stories/news-980304-120038.html.

"Groups Demand Government Action on Online Marketing to Children," American Marketplace, Apr. 4, 1996, vol. 17, No. 7, p. 53.
Healy, Thomas J., "The New Science of Borrower Behavior," Mortgage Banking, vol. 58, No. 5, pp. 26-35, Feb. 1, 1998.
Hill Kerry "Identity Theft Your Social Security Number Provides Avenue for Thieves", NewsRoom, Wisconsin State Journal, Sep. 13, 1998, pp. 4.
ID Theft Assist, "Do You Know Where Your Child's Credit Is?", Nov. 26, 2007, http://www.idtheftassist.com/pages/story14, pp. 3.
Internal Revenue Service Data Book 2000, Issued Aug. 2001, Revised May 2003.
Jones, Yvonne, "Consumers Understood the Basics but Could Benefit from Targeted Educational Efforts," GAO U.S. Government Accountability Office, Mar. 16, 2005, pp. 128, http://www.gao.gov/products/GA0-05-223.
Kulkosky, Edward, "Credit Scoring Appeal Transcends Underwriting," American Banker, vol. 161, No. 93, p. 8, May 15, 1996.
Kuykendall, Lavonne, "Divergent Paths in Early Pacts with Credit Bureaus", American Banker, May 30, 2002, vol. 167, No. 3, pp. 2.
Lan, Joe, "The Top Portfolio Management Software," http://www.aaii.com/computerizedinvesting/article/the-top-portfolio-management-software, Includes Discussion thread, Fourth Quarter 2011, pp. 17.
LendingTree.com, "Lender Ratings & Reviews," http://web.archive.org/web/20091015043716/http://www.lendingtree.com/lender-reviews/, Oct. 15, 2009, in 21 pages.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
LifeLock, "Identity Theft F.A.Q." http://web.archive.org/web/20080215093614/http://www.identitytheftkiller.com/promo/faq.php, Feb. 15, 2008, pp. 8.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
Longo, Tracey, "Managing Money: Your Family Finances", Kiplinger's Personal Finance Magazine, Jun. 1, 1995, vol. 49, No. 6, pp. 4.
Lund, Graham, "Credit Bureau Data: Maximizing the Benefits," Credit Management, May 2004, ProQuest Central, pp. 44-45.
Merriam Webster's Collegiate Dictionary, 10th Edition, 1999, p. 79.
Montgomery County Housing Report, Residential Market Report, Jan. 2004 in 6 pages.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
"New Privista Product Provides Early Warning System to Combat Identity Theft", PR Newswire, Oct. 24, 2000, PR Newswire Association, Inc., New York.
"New for Investors: Asset Allocation, Seasoned Returns and More," Prosper, http://blog.prosper.com/2011/10/27/new-for-investors-asset-allocation-seasoned-returns-and-more/, pp. 4.
Novack, Janet, "The Coming Fight over FICO," Forbes, Dec. 18, 1995, vol. 156, No. 14, p. 96.

(56) References Cited

OTHER PUBLICATIONS

Office of Integrated Analysis and Forecasting, DOE/EIA-M065(2004), Model Documentation Report: Macroeconomic Activity Module (MAM) of the National Energy Modeling System, EIA, Washington DC, Feb. 2004.
Pagano, et al., "Information Sharing in Credit Markets," Dec. 1993, The Journal of Finance, vol. 48, No. 5, pp. 1693-1718.
"ProClarity and Microsoft to Host Free Seminar Series on Retail Analytics with Independent Analyst Firm-ProClarity to Share Best Forrester Analysts to Discuss Trends and the Future of the Retail"; Business Wire; pp. 2; Aug. 13, 2003.
"Qualifying for Debt Settlement", http://www.certifieddebtcom/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Ratner, Juliana, "GMAC to Sell Risk-Management Advice; Target is 150 Biggest Home Loan Servicers," American Banker, vol. 161, No. 53, p. 16, Mar. 19, 1996.
"Recognition and use by Appraisers of Energy-Performance Benchmarking Tools for Commercial Buildings," prepared by the Institute for Market Transformation, NYSERDA, Feb. 2003, pp. 6.
"Resolve Debt for Less: With Help from Freedom Financial" http://www.debtsettlementusa.com/ printed Jan. 9, 2013 in 6 pages.
"RF/Spectrum to Offer Score," National Mortgage News, Special Report; Credit Reporting & Scaring, Jun. 9, 1997, p. 40.
Risk Monitors, "New GMAC Unit Focuses on Portfolio Risk," PR Newswire, Mar. 13, 1996, pp. 2. http://www.thefreelibrary.com/NEW+mGMAC+UNIT+FOCUSES+ON+PORTFOLIO+RISK-a018092212.
Saunders, A., "Data Goldmine," Management Today, London: Mar. 1, 2004, 6 pages.
Screenshot for Investment Account Manager v.2.8.3, published at http://www.aaii.com/objects/aet/1642.qif by at least Aug. 30, 2011 in 1 page.
"Settling Your Debts—Part 1 in Our Debt Settlement Series", http://www.creditinfocenter.conn/debt/settle_debts.shtml printed Jan. 9, 2013 in 6 pages.
"Shareholders Sue Green Tree Financial," Dated Dec. 4, 1997, http://web.archive.org/web/20000419070107/http://www.wcco.com/news/stories/news-971204-092238.html.
Steele, Georgia, "Fair, Isaac Seeks Mortgage Tech Opportunities," National Mortgage News, Special Report; B& C Lending, Mar. 23, 1998, p. 34.
Sullivan, Deidre, "Scoring Borrower Risk," Mortgage Banking, Nov. 1994, vol. 55, No. 2, pp. 94-98.
Taylor, Marshall, "Loan-Level Pricing Draws Interest From Investors," Real Estate Finance Today, Jul. 7, 1997, vol. 14, No. 14. p. 10.
"The Best of the Best," Mortgage Technology, Nov. 1, 2003, vol. 10, No. 8, pp. 34-53.
"TransUnion—Child Identity Theft Inquiry". TransUnion. http://www.transunion.com/corporate/personal/fraudIdentityTheft/fraudPrevention/childIDInquiry.page, printed Nov. 5, 2009 in 4 pages.
Trulia, "Trulia Estimates," http://www.trulia.com/trulia_estimates/, printed Feb. 18, 2014 in 2 pages.
Tuman, Diane, "What is a Zestimate?" Mar. 2013, pp. 5, http://www.zillow.com/wikipages/What-is-a-Zestimate/.
Vamosi, Robert, "How to Handle ID Fraud's Youngest Victims," Nov. 21, 2008, http://news.cnet.com/8301-10789_3-10105303-57.html.
Van Collie, Shimon, "The Road to Better Credit-Card Marketing," Bank Technology News, Sep. 1995, pp. 4.
Verstraeten, Geert, Ph.D.; Issues in predictive modeling of individual customer behavior: Applications in targeted marketing and consumer credit scoring; Unversiteit Gent (Belgium) 2005.
Wahl, Martin, "The Stampede to Subprime," Mortgage Banking, Oct. 1, 1997, vol. 58, No. 1, p. 26(7).
"We Eliminate Bad Debt", as printed from http://www.webcreditbureau.com/start/, dated Aug. 22, 2012, 1 Page.
Yang, et al., "An Analysis of the Ex Ante Probabilities of Mortgage Prepayment and Default", Real Estate Economics, Dec. 1998, vol. 26, No. 4, pp. 651-676.

* cited by examiner

SAMPLE DATA STRUCTURE FOR SLIDERS

SYSTEMS AND METHODS OF PRESENTING SIMULATED CREDIT SCORE INFORMATION

CROSS-REFERENCE TO RELATED APPLICATIONS

This application is related to, but does not claim priority from, U.S. patent application Ser. No. 10/452,155, filed May 30, 2003, now U.S. Pat. No. 7,610,229; U.S. patent application Ser. No. 12/606,060, filed Oct. 26, 2009, now U.S. Pat. No. 8,015,107; U.S. patent application Ser. No. 11/150,480, filed Jun. 10, 2005, now U.S. Pat. No. 7,593,891; U.S. patent application Ser. No. 12/563,779, filed Sep. 21, 2009, now U.S. Pat. No. 7,925,582; and U.S. Prov. Pat. App. No. 60/384,650, filed May 30, 2002. The disclosures of the above-listed applications are all hereby incorporated by reference as if set forth herein in their entireties.

BACKGROUND

This disclosure relates to the field of consumer credit information and particularly to the presentation of simulated credit score information.

The credit score is an important indicator of a consumer's financial health. Consequently, having a high credit score is important to consumers for many reasons. A high credit score is required for such things as loan applications, rental applications, real estate mortgages, and so on. Thus, many consumers have a substantial interest in finding ways to improve their credit scores.

There is much information available to consumers as to how to improve credit scores. For example, sources provide advice to consumers to pay off loans, to establish certain numbers of credit accounts, to establish new loans, to raise or lower credit card limits, and so on. However, this advice is generic to all consumers and does not provide information specific to a particular consumer's situation. The question for many consumers then is which of the suggested actions would be the most effective in improving that consumer's credit score based on that consumer's situation.

SUMMARY

Thus, it would be advantageous for consumers to be able to quickly investigate the various actions that may be taken to change one's credit score and the effect that those actions would have. In particular, it would be advantageous for consumers to be able to visualize those effects in an interactive and real time manner.

An embodiment is a computer-readable medium that operates a computer system. The system receives credit information relating to a consumer. The system calculates a credit score associated with the consumer based on the received credit information and further based on a credit score calculation algorithm. The system constructs a credit score scenario user interface. The system maintains a plurality of credit score simulation scenarios and calculates a plurality of simulated credit scores associated with respective credit score simulation scenarios. Each simulated credit score is calculated based on the credit score calculation algorithm and further based on the received credit information with modifications in accordance with the respective credit score simulation scenario. The system transmits first user interface data configured to cause the display of a user interface including a listing of information associated with respective credit score simulation scenarios, in conjunction with the simulated credit scores for respective credit score simulation scenarios. The system also constructs a credit score simulation control interface. The system maintains a plurality of credit score simulation parameters and transmits second user interface data configured to cause the display of a user interface comprising a graphical indication of the calculated credit score. The second user interface data further comprises a plurality of sliders, each slider being associated with a credit score simulation parameter, each slider being divided into a plurality of segments that are colored to graphically indicate the likely effect of repositioning the slider within the respective segment. The system also transmits executable code in association with the second user interface data, The executable code is configured to update in real time, in response to the user repositioning one or more of the sliders, the graphical indication of the calculated credit score, based on a recalculation of the credit score using at least parameters determined from the one or more repositioned sliders.

In an embodiment, constructing the credit score scenario user interface further comprises selecting a subset of the plurality of simulated credit score simulation scenarios, and wherein the listing of information associated with respective credit score simulation scenarios is based on the selected subset of the plurality of simulated credit score simulation scenarios.

In an embodiment, the first user interface data is further configured to display extended information for one or more of the respective credit score simulation scenarios in response to a user interaction with the listing of information.

In an embodiment, the first user interface data is further configured to display additional credit score simulation scenarios in response to a user interaction with the listing of information.

In an embodiment, the second user interface data is further configured to display a graphical indication of a current credit score, and wherein the executable code is configured to update the graphical indication of the calculated credit score but not to update the graphical indication of the current credit score.

In an embodiment, each slider of the plurality of sliders is initially positioned based upon the credit information relating to the consumer.

In an embodiment, a system performs a method of automatically calculating credit score simulation information to a user. The system receives credit information relating to a consumer. The system identifies a plurality of credit score simulation scenarios, each credit score simulation scenario including data indicating credit score simulation parameters associated with the respective credit score simulation scenario. The system executes, using a computer processor, a credit score simulation calculation for each of the credit score simulation scenarios. Each execution of the credit score simulation calculation for a credit score simulation scenario is based on the credit information and the credit score simulation parameters associated with the respective credit score simulation scenario. The execution produces simulated credit scores for respective credit score simulation scenarios. The system constructs user interface data configured to cause the display of a user interface including a listing of information associated with respective credit score simulation scenarios, in conjunction with the simulated credit scores for respective credit score simulation scenarios. The system then transmits the constructed user interface data.

In an embodiment, the method also includes calculating a credit score based on the credit information, and wherein the user interface further includes the calculated credit score.

In an embodiment, at least one of the simulated credit scores are greater than the calculated credit score, and at least some of the simulated credit scores are less than the calculated credit score, and wherein the user interface graphically differentiates the greater and less simulated credit scores.

In an embodiment, the user interface is configured to display, upon clicking an element of the listing of information associated with a particular credit score simulation scenario, expanded information including further credit score simulation data related to the particular credit score simulation scenario.

In an embodiment, the user interface is configured to display expanded information by requesting and receiving further credit score simulation data from an external server.

In an embodiment, identifying the plurality of credit score simulation scenarios comprises selecting a subset of credit score simulation scenarios based at least in part upon the received credit information.

In an embodiment, the selected subset of credit score simulation scenarios is further based upon stored user preferences.

In an embodiment, the listing of information is sorted by the simulated credit scores for respective credit score simulation scenarios.

In an embodiment, a system performs a method of constructing a credit score simulation control interface. The system receives credit information associated with a consumer. The system calculates, using a computer processor, a credit score based on the received credit information. The system constructs user interface data configured to cause the display of a user interface comprising a graphical indication of the calculated credit score. The user interface data further comprises a plurality of sliders, each slider being associated with a credit score simulation parameter, each slider being divided into a plurality of segments that are colored to graphically indicate the likely effect of repositioning the slider within the respective segment. The system transmits the constructed user interface data. The system transmits executable code in association with the constructed user interface data. The executable code is configured to update in real time, in response to the user repositioning one or more of the sliders, the graphical indication of the calculated credit score, based on a recalculation of the credit score using at least parameters determined from the one or more repositioned sliders.

In an embodiment, the graphical indication of the calculated credit score comprises a colored dial and a pointer. The colored dial is divided into a plurality of segments that are colored, and at least a portion of the colors of the segments of the colored dial correspond to the colors of the segments of the sliders.

In an embodiment, the user interface further comprises a graphical indication of a current credit score, and wherein the executable code is configured to update the graphical indication of the calculated credit score but not to update the graphical indication of the current credit score.

In an embodiment, the user interface further comprises a graphical comparative indicator of whether the current credit score is greater than, equal to, or less than the calculated credit score, and wherein the executable code is further to update, in real time, the graphical comparative indicator.

DETAILED DESCRIPTION

Figure 1:
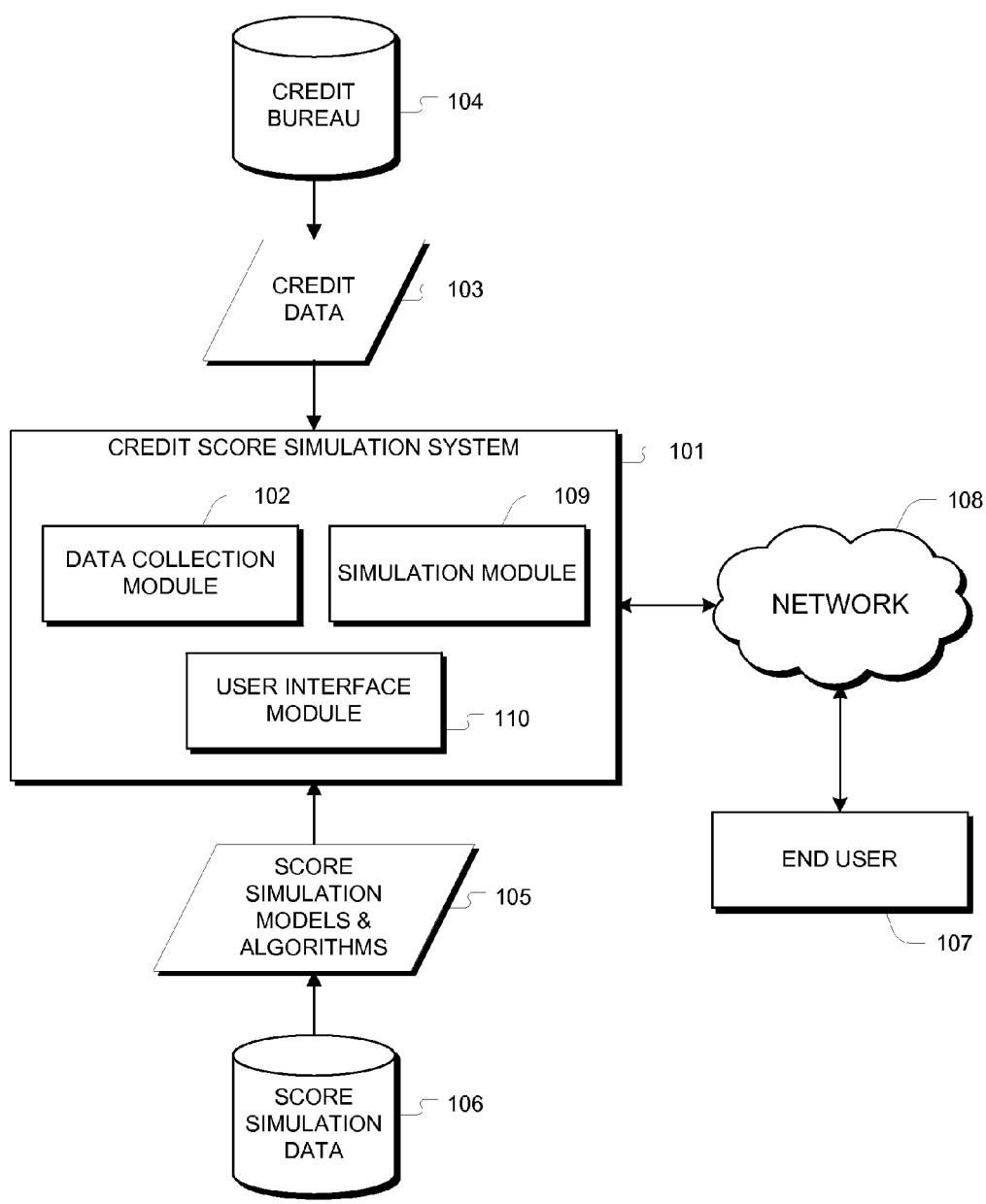
FIG. 1 is a block diagram showing a credit score simulation computing system, as used in an embodiment.

FIG. 1 is a block diagram of an embodiment of a credit score simulation computing system, in conjunction with related components. Credit score simulation system 101 may be a single computing device or a plurality of computing devices connected by a network or distributed computing system.

In an embodiment, various software modules are included on credit score simulation system 101, which may be stored on the system itself, or on computer readable storage media separate from the system and in communication with the system via a network or other appropriate means. The credit score simulation system 101 may include a data collection module 102, which performs various tasks of gathering data used by the credit score simulation system. Such data may include, for example, credit data 103 retrieved from credit bureau 104. The credit data 103 may be retrieved via a network, via a dedicated communication channel, or by other means. In an embodiment, credit bureau 104 transmits credit data 103 to the credit score simulation system 101 via a secured communication channel to ensure the privacy and security of the credit data.

In an embodiment, credit data 103 is gathered on demand as required by credit score simulation system 101. In another embodiment, credit data 103 is gathered on a periodic basis independent of requests for information to the credit score simulation system 101. In another embodiment, credit data 103 is stored on the credit score simulation system 101, in which case, retrievable of credit data 103 from a credit bureau 104 may not be necessary. In another embodiment, credit data 103 is entered by a user rather than retrieved from a credit bureau.

Data collection module 102 may also gather score simulation models and/or algorithms 105 from a score simulation data store 106. The score simulation models and algorithms may include formulas, executable code, web browser code, JavaScript code, statistical parameters, statistical variables, and the like. In an embodiment, the models and/or algorithms 105 are retrieved from score simulation data store 106 on an on-demand basis as needed by the credit score simulation system 101. In another embodiment, the models and/or algorithms 105 are retrieved on a periodic basis. In another embodiment, the credit score simulation system 101 internally stores the models and/or algorithms 105, in which case a separate score simulation data store 106 may not be required.

The credit score simulation system 101 may also include a simulation module 109, which may include executable instructions for performing credit score simulations. Various algorithms for performing such simulations of credit scores are described throughout the specification. Further algorithms and disclosures of score simulation techniques and algorithms are presented in the related applications that are incorporated by reference.

Simulation module 109 may use data retrieved by data collection module 102, such as credit data 103 and/or models and/or algorithms 105, as input to the simulation. Furthermore, simulation module 109 may interact with one or more end users 107 via a network 108. In various embodiments, network 108 may be the Internet, a local area network, a wide area network, a telecommunications network, a cellular telephone network, a standard telephone network, or the like.

In an embodiment, simulation module 109 may receive one or more parameters from end user 107. Such parameters may indicate personal information about the end user which simulation module 109 may use to determine appropriate credit data 103 to be applied or retrieved. Furthermore, simulation module 109 may receive, from end user 107, requests to simulate a credit score based on certain user-defined parameters.

In an embodiment, the credit score simulation system 101 further includes user interface module 110, which may include executable instructions for constructing user interfaces or otherwise interacting with end users 107. User interface module 110 may receive data from data collection module 102 and/or simulation module 109, and use that data to construct user interfaces that may embody, for example, the results of a credit score simulation. Those interfaces may then be communicated to end user 107. Such simulations may be presented to the end user via various user interfaces designed to be easily manipulated and/or understood by the user. In an embodiment, the user interfaces transmitted by user interface module 110 are interactive. Various embodiments of the user interfaces that may be provided by user interface module 110 are shown and described throughout this specification. Variations on such interfaces and other possible interfaces will be known to those of skill in the art. For example, user interface module 110 may provide a telephone or voice-activated command interface, a SOAP or REST API, a desktop computer application interface, or the like.

User interface module 110 may be configured to construct user interfaces of various types. In an embodiment, user interface module 110 constructs web pages to be displayed in a web browser. The web pages may, in an embodiment, be specific to a type of device, such as a mobile device or a desktop web browser, to maximize usability for the particular device. In an embodiment, user interface module 110 may also interact with a client-side application, such as a mobile phone application or a standalone desktop application, and provide data to the application as necessary to display credit score simulation information.

Figure 2:
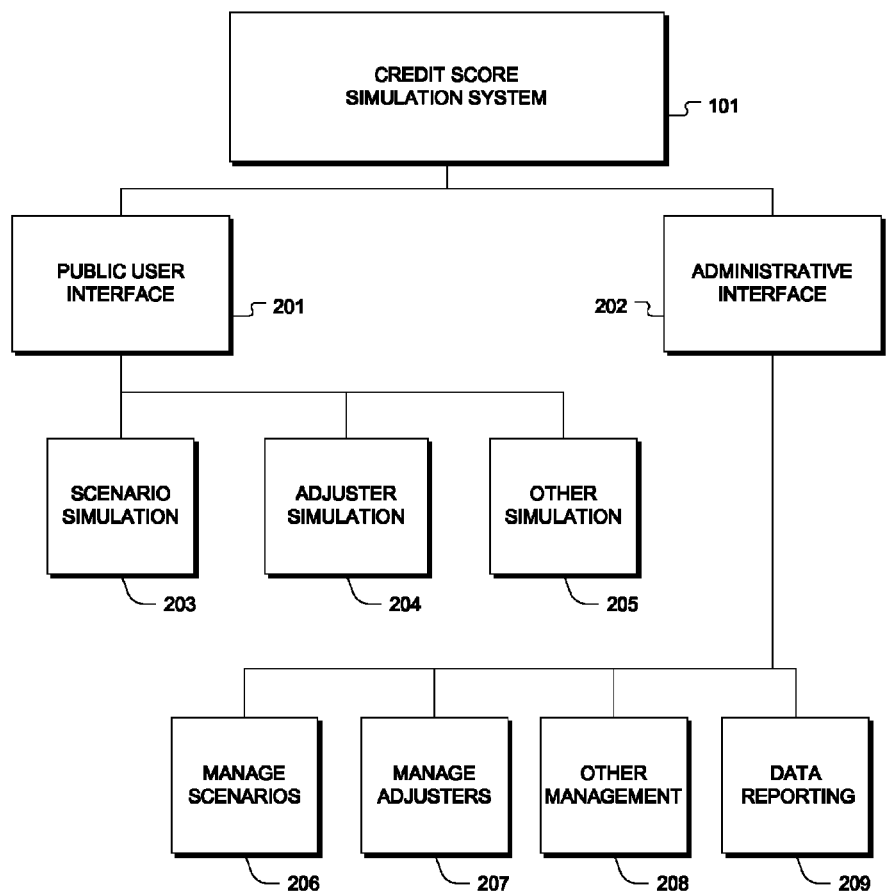
FIG. 2 is a hierarchical block diagram depicting the organization of components of a score simulation system such as the website, as used in an embodiment.

FIG. 2 is a hierarchical block diagram showing an organization for a score simulation system. In an embodiment, the score simulation system presents a website comprising a number of web pages organized in the fashion shown in FIG. 2. In other embodiments in which interfaces other than web pages are used, similar organizational structures may be applied as is appropriate to the particular means of communication. For example, in a telephone-based system, the organization of FIG. 2 may be embodied as an automated telephone response tree.

In an embodiment, credit score simulation system 101 includes two interfaces: a public user interface 201 and an administrative interface 202. In an embodiment, the public user interface is accessible by any user in communication with score simulation system 101 while administrative interface 202 is only accessible to particular individuals such as administrators. In an embodiment, administrative interface 202 may be protected by a password, by IP-based authentication, or by other means.

Public user interface 201 may include one or more modules that may be accessed by users. The users accessing public user interface 201 may be the consumers themselves. Alternatively, the users accessing public user interface 201 may be entities interested in particular consumers. For example, a bank or landlord may access public user interface 201 to perform credit score simulation on a prospective loan recipient or tenant.

In various embodiments, the public interface may include an authenticated section that may be accessed only by authenticated users, such as members who have signed up for an account and/or paid a fee such as a subscription fee. The public interface may further include an unauthenticated section that may be accessed by users regardless of authentication status, or that may be accessed by unauthenticated users. The authenticated and unauthenticated sections may have the same features, similar features, or different features. In an embodiment, the authenticated section offers additional features not available in the unauthenticated section. For example, credit data or credit-related information is used in the various systems and methods described herein. This information be stored in member accounts or automatically retrieved based on member account data. In such an embodiment, the credit-related information may be automatically pre-populated, so that members need not enter that information, while unauthenticated users would enter their information manually.

Figure 4:
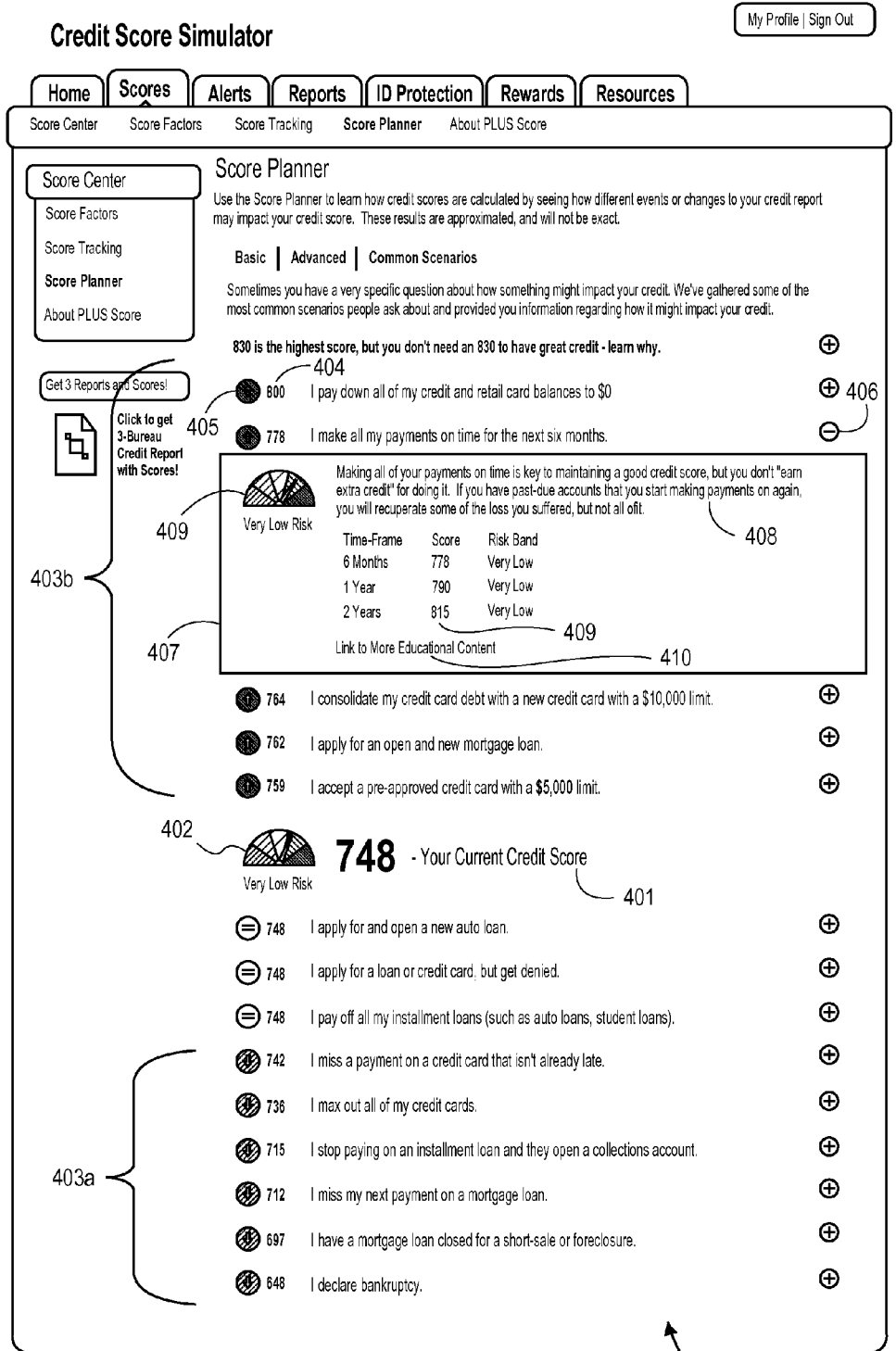
FIG. 4 is a sample user interface for analyzing score simulations, as used in an embodiment.
Figure 8:
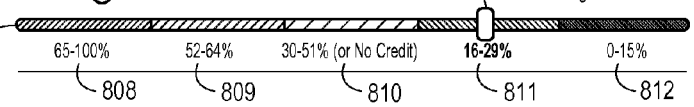
FIG. 8 is a sample user interface for simulating credit scores, as used in an embodiment.

Public user interface 201 includes a scenario simulation section 203 which may enable the user to view various predetermined scenarios and determine simulated credit scores associated with those various scenarios. An embodiment of a user interface presented by such a section is shown in FIG. 4. Public user interface 201 may further include an adjuster simulation section 204 which may enable the user to view credit scores and interactively adjust parameters that affect that score. An embodiment of a user interface presented by such a section is shown in FIG. 8. Public user interface 201 may further include other simulation section 205. In various embodiments, public user interface 201 may include all of these sections, some of these sections, and/or other sections as may be contemplated by those of skill in the art.

Administrative interface 202 may also comprise various sections. For example, it may include a scenario management section 206 where an administrator to the system may add, remove or modify various score simulation scenarios.

In an embodiment, input relating to the scenarios managed using interface section 206 affects the scenarios presented in section 203 of the public user interface. Administrative interface 202 may also include an adjuster management section 207 which similarly may be used to effect the adjuster simulation section 204 of the public user interface. Administrative interface 202 may also include other management features 208 or may include fewer features. Additionally, administrators to the system may find it useful to review statistics or other information relating to the usage of the credit score simulation system. Such information may be provided using data reporting section 209 of the administrative interface. In various embodiments, other sections or fewer sections may be included in the administrative interface 202. In an embodiment, no administrative interface is provided.

Figure 3:
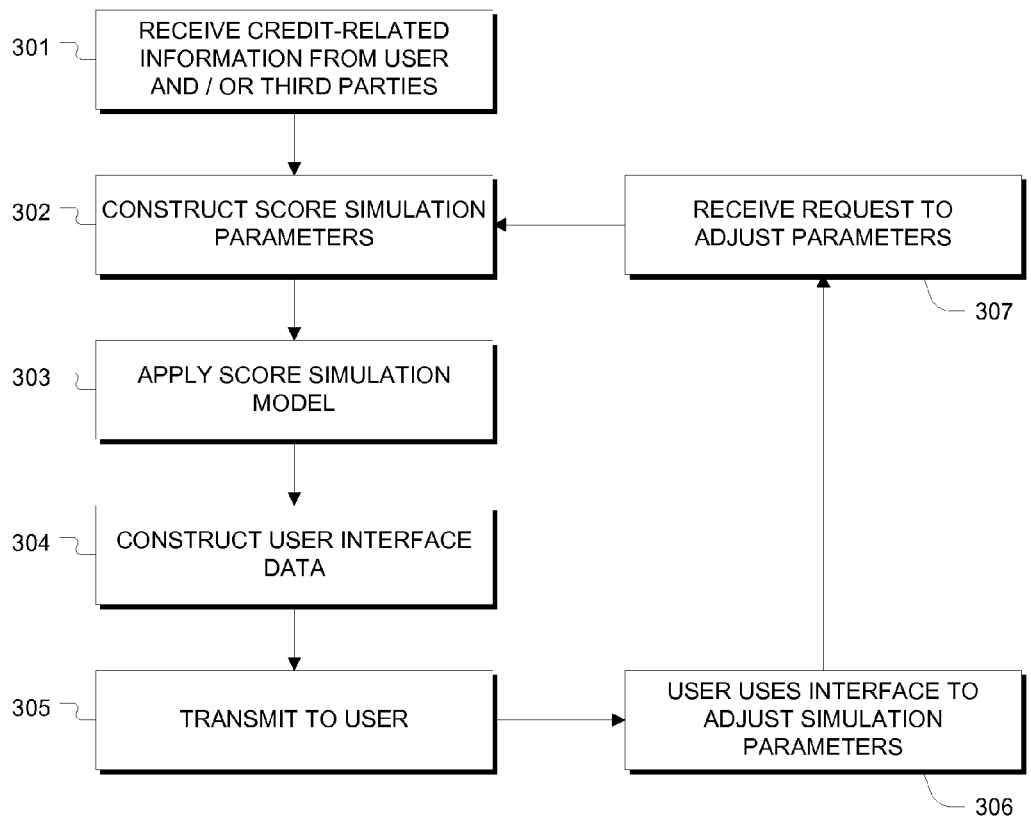
FIG. 3 is a flowchart of a process of credit score simulation, as used in an embodiment.

FIG. 3 is a flowchart of a process of credit score simulation as used in an embodiment. The process may be performed, for example, by a credit score simulation system 101 of FIG. 1, or by other suitable computing systems. In an embodiment, the process shown in FIG. 3 may be performed substantially in real time so that the user requesting information is presented with that information without substantial delay. In various embodiments, fewer blocks or additional blocks may be included in the process, or various blocks may be performed in an order different from that shown in FIG. 3.

At block 301, the system receives credit-related information from a user and/or third parties. Such information may include personal identifying information enabling the system to determine the identity of the user or another individual. The information may further enable the system to retrieve credit data associated with the appropriate individual. Furthermore, such information may include the public data as retrieved from a credit bureau or other credit information source. In an embodiment, the credit data retrieved is a credit score. In an embodiment, the credit information retrieved is credit data from a consumer's credit history that the system 101 may use to calculate a credit score for the consumer, such as based on a credit score model of a credit bureau or based on a credit score model that is configured to approximate credit scores provided by one or more credit bureaus. Further data may be retrieved by the system and incorporated into the processes described herein.

At block 302, the system constructs one or more credit score simulation parameters and/or other data. These parameters may be used by the system to simulate a credit score. For example, such data may include the credit score itself, which may be calculated using credit data of the consumer. Additional parameters relating to the consumer's credit usage may be calculated as well. For example, the system may use credit data to calculate aggregate or average information, such as the average credit balance for the consumer or the average number of months late that the consumer pays off credit card debt.

In an embodiment, the data constructed at block 302 may include information on how much a particular consumer's credit score would be affected by various activities. In an embodiment, the data may include information about types of actions that may be taken by the individual whose credit score is being simulated. This information may be based on particular personal information associated with the individual. For example, the system may determine that a consumer has no credit cards based on, for example, information received at block 301. In such a case, at block 302, the system may determine that it is not possible for the user to pay off the consumer's credit card debt and thus, the system will not recommend doing so.

In an embodiment, the data constructed at block 302 may include summary information associated with the user's credit behavior. Such information may be derived from the user's credit report, may be received directly from the user, or may be gathered by other means. Other such parameters may be constructed at block 302.

At block 303, the system applies one or more credit score simulation models to determine a simulated credit score. Various score simulation models may be used. Some of such models are disclosed throughout this specification and in the related applications that are incorporated by reference. In various embodiments, the score simulation model may incorporate information about the consumer's actual credit score, or it may estimate the consumer's credit score based on user provided information alone and/or other information, without relying on an actual credit score. In an embodiment, the score simulation model may be based on various statistical models such as linear regression, non-linear regression, neural networks, and the like. The results of applying the score simulation model at block 303 may include one or more simulated credit scores and possibly other information, which may include, for example, recommendations for possible actions to be taken, ranges of credit scores, possible parameters for adjustment, and so on.

At block 304, the system uses the results of the score simulation model from block 303, as well as other information, to construct user interface data. The user interface data may take on various forms depending on the particular means of communication with the user who initiated the request. In various embodiments, the user interface data may be web page data, application-specific data, mobile application data, or other such graphical data. In other embodiments, the user interface data may not be visual data, but rather be audio data, XML data, comma-separated values (CSV) data, and so on.

At block 305, the user interface data constructed at block 304 may be transmitted to the user, who may be the consumer or other entity. At block 306, the user may use the user interface to adjust various simulation parameters. This may be done, for example, via an interactive user interface that provides various controls configured to be manipulated by the user. The interface may be configured to convert those user manipulations into data that may be transmitted back to the score simulation system.

At block 307, the adjusted parameters are transmitted to the system, and the system receives a request to adjust parameters. Upon receiving the request to adjust the parameters, the system further may perform various steps in the process of FIG. 3 to calculate updated credit score simulation values and provide the user with further user interface data. In an embodiment, the system distinguishes between the initial transmission of user interface data and subsequent transmissions of user interface data so that it may transmit only portions that are necessary to update the user interface data in the latter case. This may be done, for example, using an XMLHttpRequest (XHR) mechanism, a data push interface, or other communication protocols.

FIG. 4 is a sample user interface, as presented by an embodiment of the credit score simulation system. In various embodiments, the user interface shown in FIG. 4 may be presented as a web page, as a mobile form application, as a stand-alone application, or by other communication means. In other embodiments, analogous interfaces may be presented using audio or other forms of communication. In an embodiment, the interface shown in FIG. 4 is configured to be interactive and respond to various user interactions. Such user interactions may include clicks with a mouse, typing with a keyboard, touches and/or gestures on a touch screen, voice commands, and/or the like.

The user's current credit score may be displayed on the user interface using interface element 401. This credit score may be an actual credit score or an estimated credit score provided based on information submitted by the user. In addition to the user's numeric credit score, the interface may optionally or alternatively present a graphical and/or textual representation of the user's credit rating 402. In an embodiment, the graphical representation of the rating may include a dial with a pointer indicating the user's relative credit risk. In an embodiment, a textual representation may include a textual description of the user's credit risk rating such as "Very Low Risk." Both a graphical and a textual representation may be included, or only one, or neither, in various embodiments.

In an embodiment, the interface may include a listing or other display of various scenarios 403, representing possible actions that may potentially affect the consumer's credit score. The scenarios 403 listed in FIG. 4 may be a predefined list of scenarios displayed for every consumer whose information is displayed by the system. Thus, because the same scenarios are used for each consumer, the consumer's credit rating 402 may be located at different locations between the predefined scenarios 403. As shown in FIG. 4, the interface includes scenarios 403*a* that would cause a decrease in credit score of the consumer, as well as scenarios 403*b* that would cause an increase in the credit score of the consumer.

In another embodiment, the scenarios are selected based on information relating to the consumer. For example, the system may omit particular scenarios that are not applicable to the consumer's situation, as determined based on the consumer's credit history or other personal information. In other embodiments, the system may identify actions that are particularly relevant to the consumer and graphically highlight or otherwise identify them. In an embodiment, the selected scenarios are chosen based on factors such as scenarios of the most interest to the general public, the level of impact on the simulated credit score (for example, selecting scenarios having the most impact), scenarios relevant to the consumer based on the consumer's credit history or spending habits, and/or other factors.

In an embodiment, a subset of scenarios is initially displayed, and then an expanded list of scenarios may be optionally shown upon user request. For example, if the system determines that a consumer could easily pay off credit card debt but would have more difficulty paying off a home mortgage, then the system may highlight the scenario of paying off credit card debt, and/or it may omit or hide the home mortgage payment scenario. In an embodiment, the user may be provided options to add in scenarios that are not selected to be displayed, or to remove scenarios that are displayed, thus making the user interface customizable by the user.

In an embodiment, the scenarios are presented in association with an indication of an estimated credit score that would potentially result should the user perform the associated action. The simulated credit score may be calculated based on data maintained by the system relating to the action, and it may be further based on credit information associated with the particular user. The simulated credit score may be calculated using various score simulation models, as explained previously in this disclosure.

In an embodiment, each scenario is displayed with a numeric estimated score 404 and a graphical indication 405 of the simulated score. For example, as shown in FIG. 4, the graphical representation 405 may include an up arrow, down arrow, or equal sign indicating the relative change that the scenario would have on the user's credit score. In an embodiment, to further improve the user's ability to understand the user interface of FIG. 4, the graphical representations 405 are colored to reflect the relative effect the action will have on the user's credit score. For example, actions that would increase the user's credit score may be colored green, whereas actions that would decrease the user's credit score may be colored red.

In an embodiment, the listing of scenarios 403 may further be sorted in various orders, such as by the estimated credit scores 404. The user may be able to select the order in which the scenarios are sorted. In an embodiment, the interface element 401 showing the user's actual credit score is inserted into the list of scenarios 403 in an appropriate location relative to estimated scores 404. In other embodiments, the interface element 401 showing the actual score may be placed on other parts of the user interface.

The display shown for each scenario may further include extended and/or additional information 407 relating to the particular scenario. In an embodiment, to improve the appearance of the user interface, such additional information may be hidden and only displayed in response to an appropriate user interaction with the user interface. For example, in the embodiment shown in FIG. 4, the user may use interface elements 406, for example by clicking on it, to display additional information.

The display of additional information 407 may include any additional information that may be associated with the particular selected scenario. For example, the scenario associated with additional information 407 is the scenario of making all payments on time for the next six months. The additional information includes a textual description of the scenario 408 as well as further score simulations 409 for time frames different from six months. This provides the user with easy access to further credit score simulations for related scenarios.

Additionally, the display of additional information 407 may include one or more graphical and/or textual descriptions of credit score simulations 409 for the selected scenario and/or for the extended displays of related scenario. For example, dials indicating the relative simulated credit score may be shown for the selected scenario, for any or all of the related scenarios in the extended information, for both, or for neither. Additionally, in an embodiment, the additional information 407 may include one or more links 410 to further information relating to the selected action.

The user interaction employed to display additional information 407 may be, for example, a mouse click, a tap or gesture on a touch screen, a keyboard selection, a drag and drop operation, voice command, or other form of interaction. In an embodiment, when a user requests to display additional information for one particular action, any other displays of additional information are automatically hidden thereby reducing clutter on the user interface. In other embodiments, additional information 407 may always be displayed or may never be displayed.

The location at which additional information 407 is placed may also vary in various embodiments. For example, as shown on FIG. 4, additional information 407 may be displayed underneath the particular selected action. In another embodiment, additional information 407 may be shown in an internal window within the user's web browser or other application. In other embodiments, the additional information 407 may be shown in a separate pop-up window. In another embodiment, the additional information 407 may be shown on a separate web page.

One example of a scenario that may be included on the interface of FIG. 4, in an embodiment, is whether the individual accepted a pre-approved credit card offer with a particular credit limit. The particular credit limit may be $2,500, $5,000, $10,000, $15,000, or $20,000, or any other amount, in various embodiments. The expanded scenarios associated with this scenario may be based on any subset of these credit limit amounts, or all of the amounts, or further amounts.

Another example of a scenario that may be included on the interface of FIG. 4 is whether the individual makes all payments on time for a particular number of months into the future. The number of months may be 6 months, 12 months, 18 months, 24 months, or any other number, in various embodiments. The expanded scenarios associated with this scenario may be based on any subset of these numbers of months, or all of the numbers, or further numbers.

Another example of a scenario that may be included on the interface of FIG. 4 is whether the individual consolidates all of his/her major credit card balances onto one major credit card with a particular credit limit. The particular credit limit may be $2,500, $5,000, $10,000, $15,000, or $20,000, or any other amount, in various embodiments. The expanded scenarios associated with this scenario may be based on any subset of these credit limit amounts, or all of the amounts, or further amounts.

In order to generate the listing of various actions as shown on FIG. 4, the system may include a database or other data store of information relating to possible actions. An example of a data structure that may be employed to store such information about actions and/or scenarios is shown on FIG. 5. In various embodiments, the system may include additional information or less information in such a data structure. The data structure may be stored in any number of formats such as a relational database, XML data, HTML data, common separated values (CSV) data, or other formats.

Figure 5:
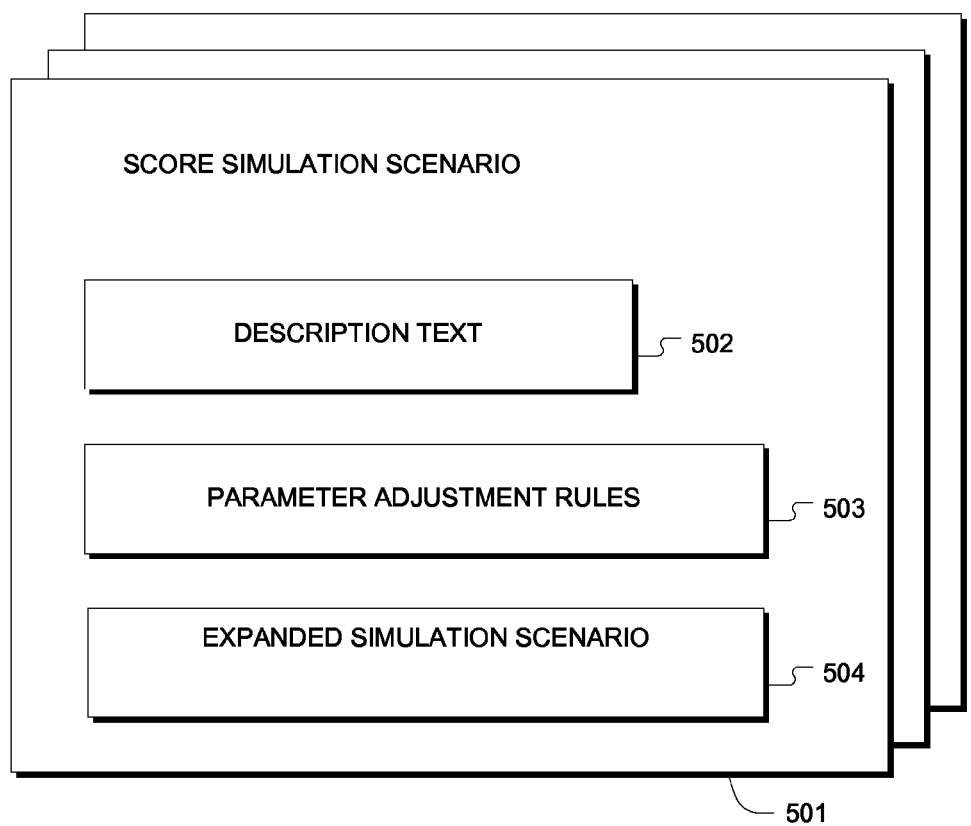
FIG. 5 is a block diagram representing a sample data structure of a credit score simulation scenario, as used in an embodiment.

In the embodiment shown in FIG. 5, one or more score simulation scenario data records 501 may be stored by the system. Each score simulation scenario data record may include a number of elements. For example, each record may include a textual description of the scenario 502. This textual description may be used in the listing of possible actions as shown in FIG. 4.

The score simulation scenario data structure 501 may further include one or more parameter adjustment rules 503. Such rules may be used to determine the appropriate simulated credit score to be associated with the scenario or action. For example, for a scenario of making all payments on time for the next six months, the parameter adjustment rules 503 may indicate how much a credit score would change should such an action be taken. The adjustment rules may account for the user's actual credit information in performing the adjustment of the credit score.

In an embodiment, the parameter adjustment rules comprise executable code that recalculates the estimated credit score. In another embodiment, the parameter adjustment rules comprise data relating to how to adjust parameters to be provided to one or more score simulation models and the score simulation models apply the parameter adjustment rules 503 to calculate the new simulated credit score.

The score simulation scenario data structure 501 may further include data relating to expanded simulation scenario data 504. This data may be used, for example, to calculate the information for the expanded display of additional information 407 shown in FIG. 4. In an embodiment, the expanded simulation scenario data 504 may include similar data elements to that of the score simulation scenario data structure 501. For example, it may include descriptive text and/or further parameter adjustment rules for each of the expanded simulations. In an embodiment, for example, the expanded simulation scenarios may include making all payments on time for the next six months, one year and two years. Thus, in this embodiment, the expanded simulation scenario data 504 may include descriptive text and parameter adjustment rules for each of those three possible expanded scenarios.

Figure 6:
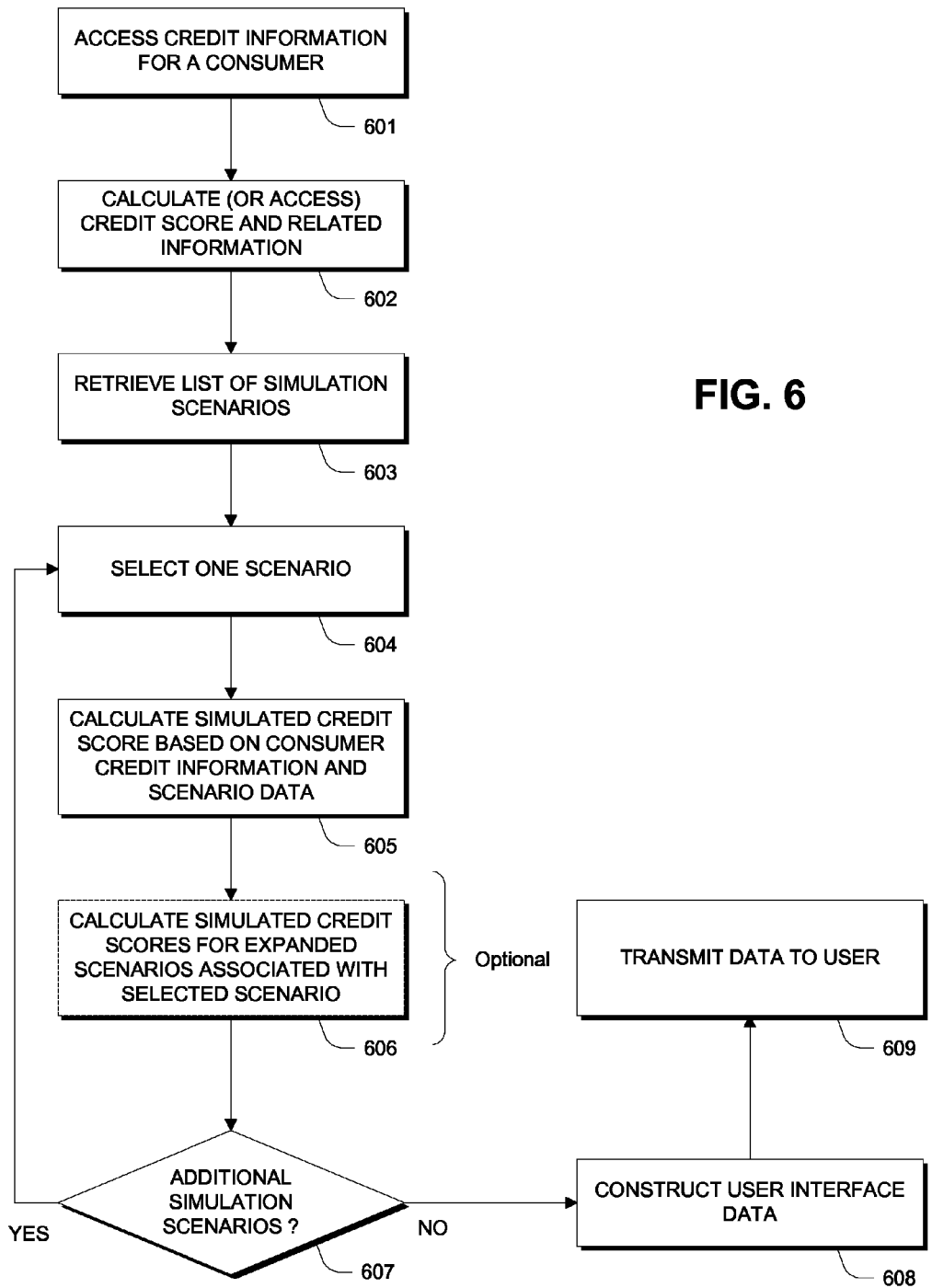
FIG. 6 is a flowchart of a process of construction of a score simulation user interface as performed on a server, as used in an embodiment.

FIG. 6 is a flowchart of a process of constructing a scenario-based credit score simulation interface. For example, the process shown in FIG. 6 may be used to construct an interface such as that shown on FIG. 4. In an embodiment, the process shown on FIG. 6 may be performed by one or more computing systems such as the credit score simulation system 101 of FIG. 6. In various embodiments, some of the blocks of FIG. 6 may not be performed, other blocks may be included, and/or blocks may be performed in an order different from that shown.

At block 601, the system accesses credit information associated with a particular consumer. The credit information may be retrieved from a credit bureau, may be stored locally on the score simulation system, may be entered by a user such as the consumer, or may be maintained and/or retrieved from other sources.

At block 602, the system calculates or accesses a credit score and related information associated with the consumer. In an embodiment, the system retrieves a credit score directly from a credit bureau or from another source. In another embodiment, the system retrieves credit data and uses that credit data and a credit score model to calculate the credit score for the consumer. Additionally, further data may be calculated or accessed at block 602. Such data may be useful, for example, in constructing the user interface for the particular consumer's situation. For example, data on the consumer's history of credit card payments may be accessed or calculated in order to present actions and/or scenarios that are appropriate to that consumer's history of credit card payments.

At block 603, the system may retrieve a list of credit score simulation scenarios. This list may be accessed and/or derived from one or more data structures such as the data structure shown in FIG. 5. In an embodiment, the system retrieves a predefined set of scenarios that are used for all consumers. In an embodiment, the predefined set of scenarios is configured to provide most consumers with at least some scenarios that would decrease the consumer's credit score, and at least some scenarios that would increase the consumer's credit score. For example, some of the scenarios may be actions that are generally known to increase credit scores (e.g., paying off outstanding debts), while some of the scenarios may be actions that are generally known to decrease credit scores (e.g., making late payments). In an embodiment, the system may not need to retrieve the scenarios since the same scenarios are used for all consumers, but may rather have the predefined set of scenarios stored locally on the system or even directly encoded in software.

In another embodiment, the system determines a subset of scenarios that are appropriate to the particular consumer's situation. This may be based, for example, on the credit score and related information that was calculated or accessed at block 602.

At block 604, the system selects a scenario from the list of scenarios retrieved at block 603. At block 605, the system calculates a simulated credit score based on the consumer credit information accessed at block 601 or calculated at block 602 and further based on data associated with the selected scenario. The simulated credit score may be calculated based on one or more statistical models available to the score simulation system, or by other means described elsewhere in this specification or known to those of skill in the art. Thus, the system may recalculate the simulated credit score for the scenario using credit data of the consumer, with some data elements replaced with data for the particular scenario being processed.

At block 606, the system optionally calculates simulated credit scores for expanded scenarios. These calculations may be used to display the additional information associated with particular actions or scenarios. The credit scores for expanded scenarios may be calculated in the same way described with respect to block 605, or by other means.

In an embodiment, the simulated credit scores for expanded scenarios are calculated prior to transmitting data to the user. In another embodiment, the system does not calculate simulated credit scores for the expanded scenarios, and instead waits to receive appropriate requests from the user before calculating simulated credit scores for those expanded scenarios. Thus, the processes of block 606 may be performed at various times in different embodiments.

At block 607, the system determines whether there are further simulation scenarios in the list of simulation scenarios retrieved at block 603. If there are, then the system returns to block 604 and further performs calculations of simulated credit scores for each of the other scenarios. If not, then at block 608, the system constructs user interface data or other data, based on the calculated credit scores and/or other information calculated or retrieved by the system. At block 609, the constructed user interface data is transmitted to a user computer.

Figure 7:
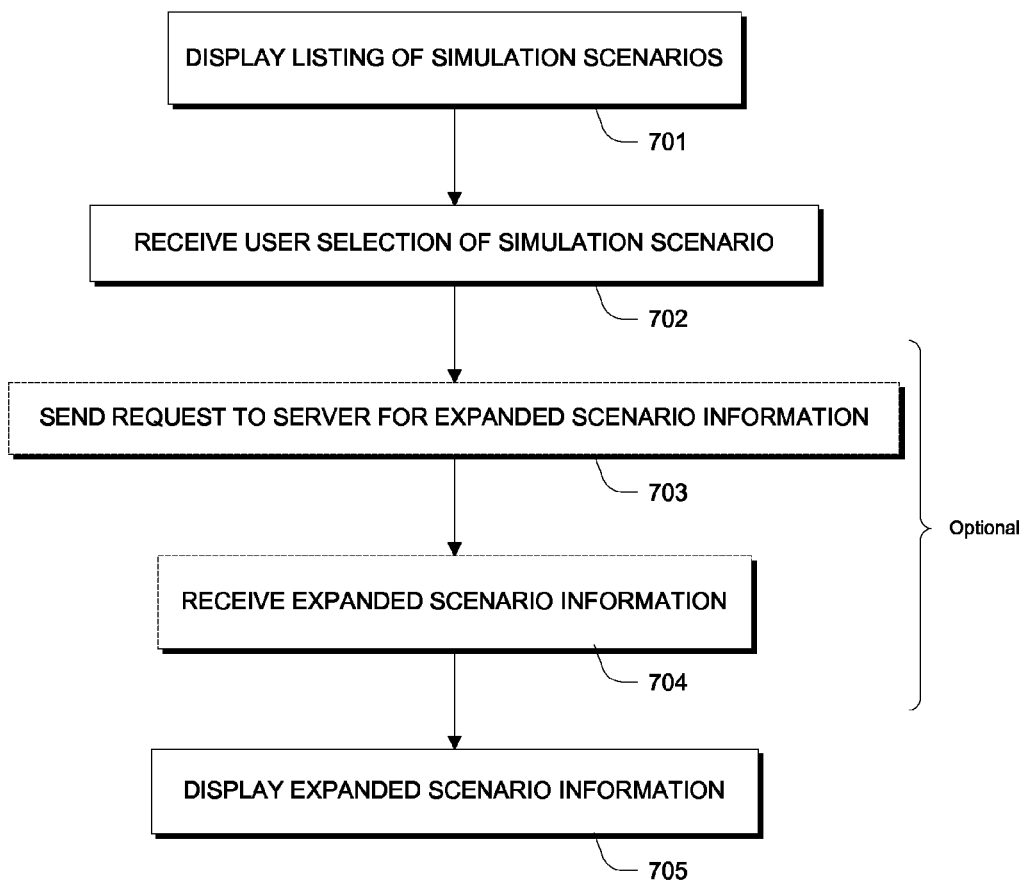
FIG. 7 is a flowchart of a process of displaying a credit score simulation user interface, as used in an embodiment.

FIG. 7 is a flowchart of a process of displaying simulation scenarios as used in an embodiment. Such a process may be performed on a client computer that is displaying a user interface such as that shown in FIG. 4. In an embodiment, parts or all of the process shown in FIG. 7 may be performed using executable code, such as JavaScript code, sent by the score simulation computer (e.g. a server) to a client computer browser in combination with the web page.

At block 701, the system displays a listing of credit scores simulation scenarios. Such a listing may appear like listing 403 of FIG. 4. At block 702, a user selection of a simulation scenario is received. Such a selection may be, for example, a mouse click on a web page. The user selection may indicate a particular scenario that has been selected or may indicate several scenarios to be selected.

At block 703, the client computer optionally sends a request to the score simulation server for expanded scenario information. At block 704, the expanded scenario information is received by the client computer. In order to do this, the score simulation system may be configured to receive such requests for expanded scenario information and to transmit that appropriate data indicating the expanded score simulation scenario information. This expanded information may be in the form of user interface data such as web page data, or it may simply include numeric credit scores or other raw information that may be formatted by the client's computer web browser in accordance with the executable code.

In another embodiment, the expanded scenario information is already available to the client computer without performing blocks 703 and 704. This may be the case, for example, where the expanded score simulation scenario information was pre-calculated and transmitted in conjunction with the user interface data that was displayed at block 701. For example, if optional block 606 of FIG. 6 was performed, then the client computer may already have received the expanded scenario information. In such a case, blocks 703 and 704 may not need to be performed. In another embodiment, the client computer performs blocks 703 and 704 the first time a user selects a particular scenario at block 702 but it caches the result received at block 704, so that it need not perform block 703 and 704 again the next time the user selects that same scenario.

At block 705, the client computer displays the expanded scenario information. This display may be presented using any number of forms such as an expanded display on the window, on internal window within the web browser, a separate pop-up window, a separate web page or tab, or other means. In an embodiment, the user interface is configured to animate the display of the expanded scenario information.

FIG. 8 is a sample user interface for credit source simulation as used in an embodiment. In this user interface, the user's current credit score may be shown at interface elements 801 and a graphical and/or textual representation of the user's credit score may be presented using interface element 802. Additionally, a simulated credit score may be presented using interface elements 803 and 804. When the user interface is initially transmitted to the client computer, the simulated score displays 803 and 804 may be equal to the actual score displays 801 and 802.

The user interface further includes one or more credit scores simulation adjusters 805. These adjusters enable the user to modify parameters to be provided to the credit score simulation system and allow it to calculate further simulated credit scores. In an embodiment, the simulation adjusters 805 are graphical sliders including a display of a bar 806 and a handle 807 configured so that the user may adjust handle 807 across bar 806, for example by clicking and dragging it so as to slide it.

In an embodiment, bar 806 comprises a plurality of segments associated with different values to be provided to the credit score simulation system. For example, bar 806 is divided into sections, each section representing different portions of credit use such as 65-100% 808, 52-64% 809, 30-51% 810, 16-29% 811, and 0-15% 812.

In an embodiment, handle 807 is initially placed within the segment of bar 806 that most closely reflects the user's actual credit information. For example, handle 807 is initially placed within region 811 because the user whose credit score is being simulated in the interface of FIG. 8 has a credit usage value of 16-29%.

In an embodiment, each of the segments 808 through 812 is colored to reflect a credit risk associated with that segment. In an embodiment, the colors are selected to correspond with those colors used in the graphical display 802 and 804. For example, a credit used amount of 65-100% may create a high credit risk and as a result, section segment 808 may be colored the same as the high risk section of elements 802 and 804. In an embodiment, segment 808 is colored red and segment 812 is colored green, to indicate that segment 812 indicates a low risk while segment 808 represents a high risk. As shown in the example of FIG. 8, not all sliders include all risk categories and the risk categories are not uniform for all sliders.

In an embodiment, the segments of bar 806 and the other interface element 805 are created automatically by the credit score simulation system and remain positioned where they are regardless of the user's adjustment of handle 807 or other manipulations of the user interface. In other embodiments, the segments may be adjusted in response to the user adjusting one or more of the interface element 805. For example, if the user moves handle 807 to indicate a different amount of credit use, this may cause other sliders or interface elements to change their colored segments and/or handles.

In an embodiment, changing the value of one or more of the simulation adjusters results in a corresponding change to the display of the potential score 803 and 804. This is shown in detail in FIGS. 9A and 9B.

Figure 9A:
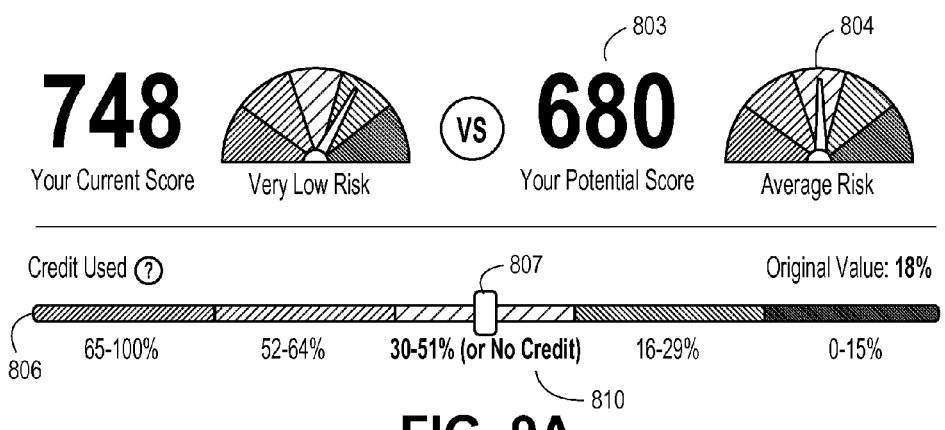
FIGS. 9A and 9B show the user interface of FIG. 8 in alternate configurations, as used in an embodiment.

In FIG. 9A, the user has moved handle 807 into region 810 of slider bar 806. In response, the user interface element 803 displaying the simulated credit score has been updated to reflect a new simulated credit score. Additionally, display 804 has been updated to graphically indicate the changed simulated credit score. While in FIG. 8 element 804 showed a very low risk for the user, in FIG. 9A, as a result of the change of the value for bar 806, element 804 displays an average risk for the user. These updates may be performed substantially in real time, so that there is minimal delay or no delay between the user moving handle 807 and the simulated credit score values being updated. In this way, the consumer is provided with a graphical indication of how various changes affect their risk level.

Figure 9B:
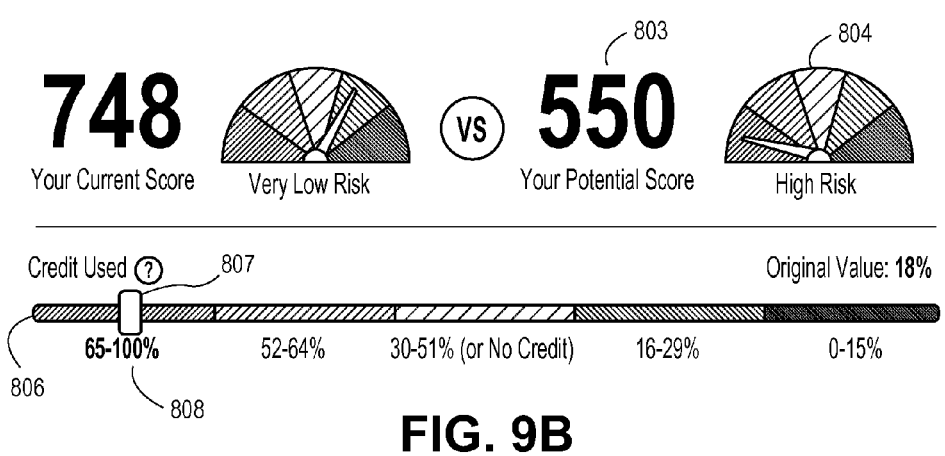

In FIG. 9B, handle 807 has been further moved into segment 808 of bar 806. Accordingly, the simulated score 803 and graphical display of the simulated score 804 have been further updated to reflect the new simulated score and a high risk category.

Although the user interface has been described with respect to slider interface elements, other user interface elements may be used in various embodiments. For example, the user may select items off of a list, rotate a dial, type in information, or otherwise interact with the user interface. Additionally, the user interface may include various graphical, textual, and other indications of changes, in addition to, or rather than, updating the simulated score 803 and graphical display 804. For example, the "vs" symbol between the current score and simulated score may be colored to reflect the difference between the scores. In an embodiment, the "vs" symbol is colored red when the potential score is lower than the current score, yellow when the scores are equal, and green when the potential score is higher than the current score. In various embodiments, audible and/or tactile feedback may further be provided based on the simulated score.

Figure 10:
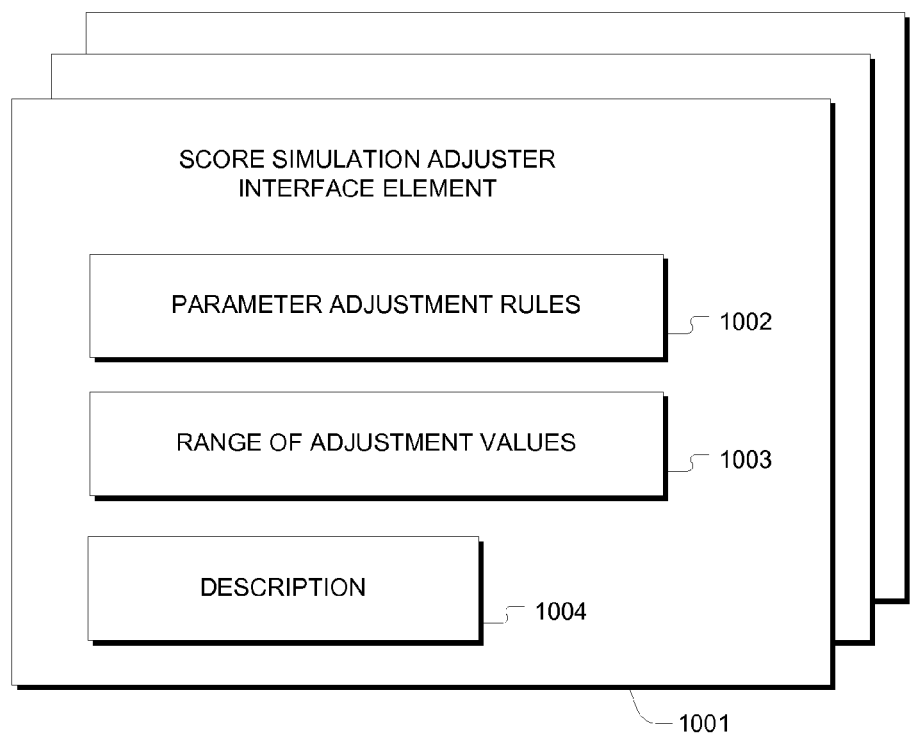
FIG. 10 is a block diagram representing a sample data structure for user interface elements for score simulation, as used in an embodiment.

The credit score simulation system maintains information about each of the adjuster elements such as slider shown in FIG. 8. The information for these adjuster interfaces may be stored in data structures such as those shown in FIG. 10. Each adjuster interface element data structure 1001 may include various information associated with the particular simulation adjuster interface elements. For example, it may include parameter adjustment rules 1002. These adjustment rules indicate how a simulated credit score should be adjusted for various values presented by the simulation adjuster interface elements.

Additionally, the data structure may include a range of adjustment values 1003 indicating what values the adjuster interface element may take on. The range of adjustment values may be a continuous range with a minimum and maximum value, or it may be a discrete set of particular values. Additionally, the data structure may include a description 1004 and/or other information useful in displaying the simulation adjustment interface element.

Figure 11:
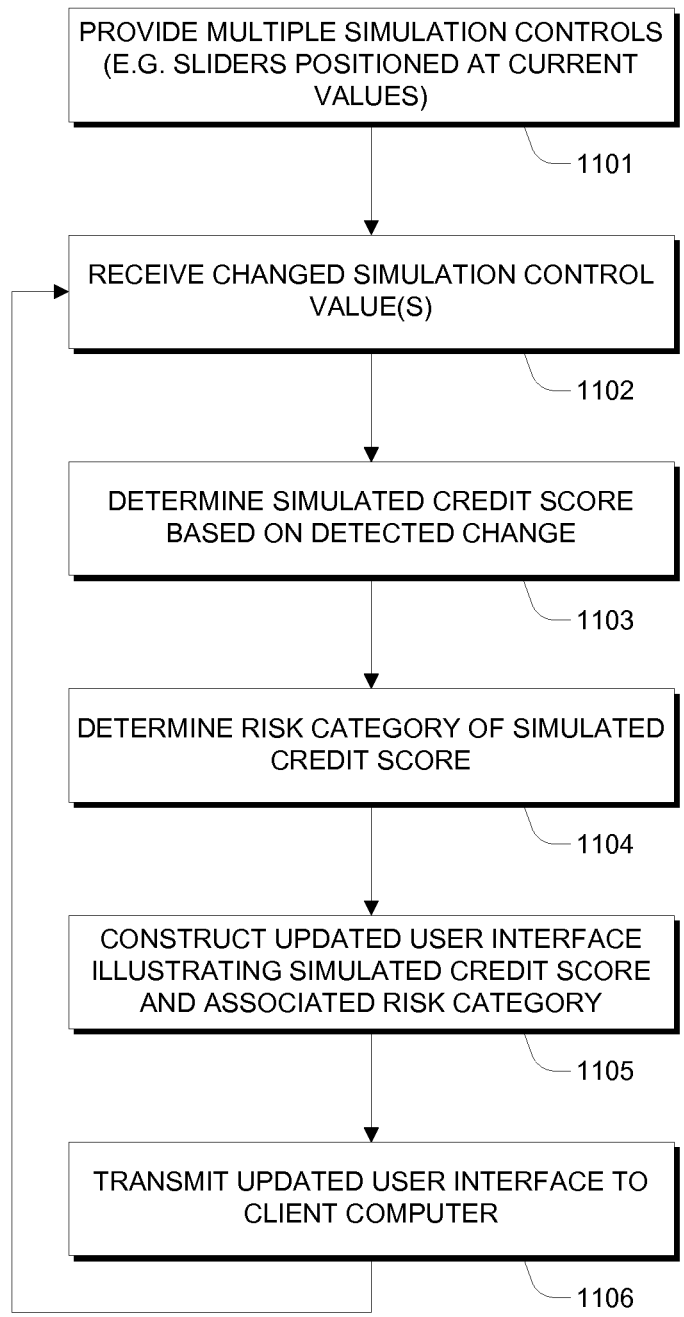
FIG. 11 is a flowchart of a process of providing a credit score simulation user interface, as used in an embodiment.

FIG. 11 shows a flowchart of a process of constructing a user interface such as that shown in FIG. 8. The process may be performed by a credit score simulation system 101 of FIG. 1 in an embodiment.

At block 1101, the system provides multiple simulation controls such as slider positions at the parameter values associated with a particular user's information. These controls may be provided via an interface such as that shown in FIG. 8. At block 1102, the system receives one or more change simulation control values. This change to simulation control values may be based on user interactions with the simulation controls. Such interaction may include, for example, sliding the handle on one or more slider bars.

At block 1103, the system determines a simulated credit score based on the depicted change to the simulation control values. The simulated credit score may further be based on actual credit information associated with the user including the user's actual credit score.

At block 1104, the system determines a risk category associated with the simulated credit score calculated at block 1103. The risk category may be based on internal data relating to risk categories for particular credit scores or range of the credit scores. At block 1105, the system constructs an updated user interface illustrating the simulated credit score calculated at block 1103 and the associated risk category calculated at block 1104. The constructed user interface may be a complete user interface such as that shown in FIG. 8, or only a portion of the user interface that requires updating.

In an embodiment, if the system determines at block 1104 that the risk category has not changed, then block 1105 may be omitted. In another embodiment, the system may only construct information or instructions to update the user interface and the actual updating of the user interface may be performed by an application such as a web browser on the client computer. In such a case, blocks 1104 and 1005 may need not be performed at all.

At block 1106, the system transmits updated user interface data or other data to the client computer. The updated data may be used then by the client computer to update the displayed user interface so that the user may see the new simulated credit score.

Figure 12:
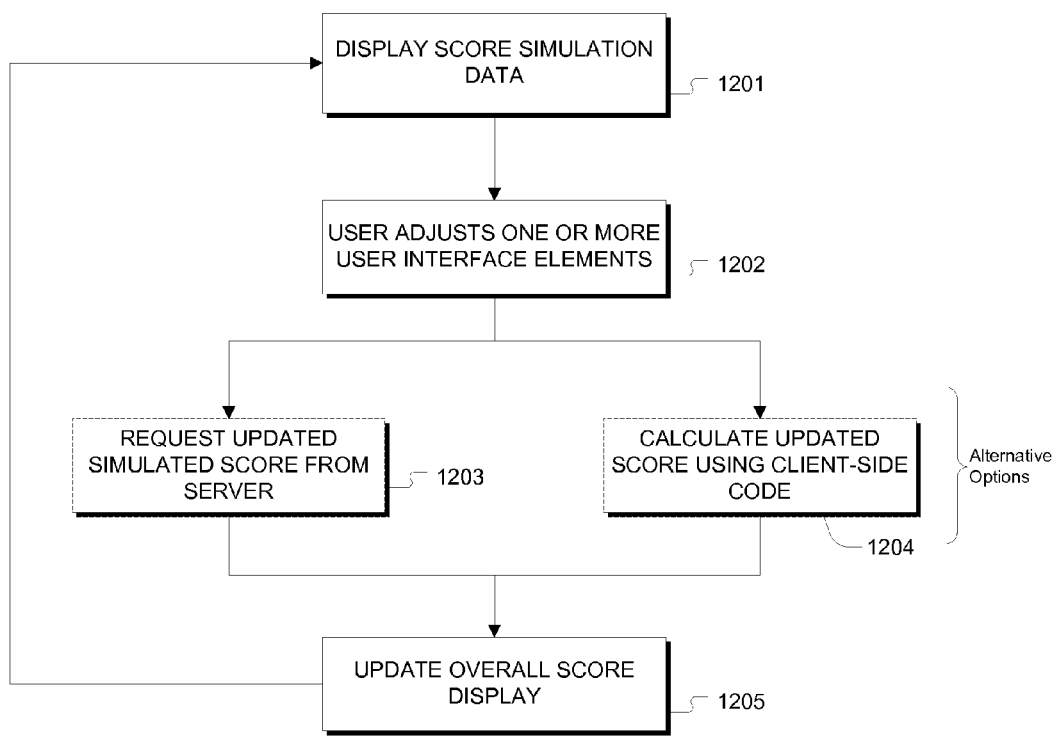
FIG. 12 is a flowchart of a process of displaying a credit score simulation user interface, as used in an embodiment.
Figure 13A:
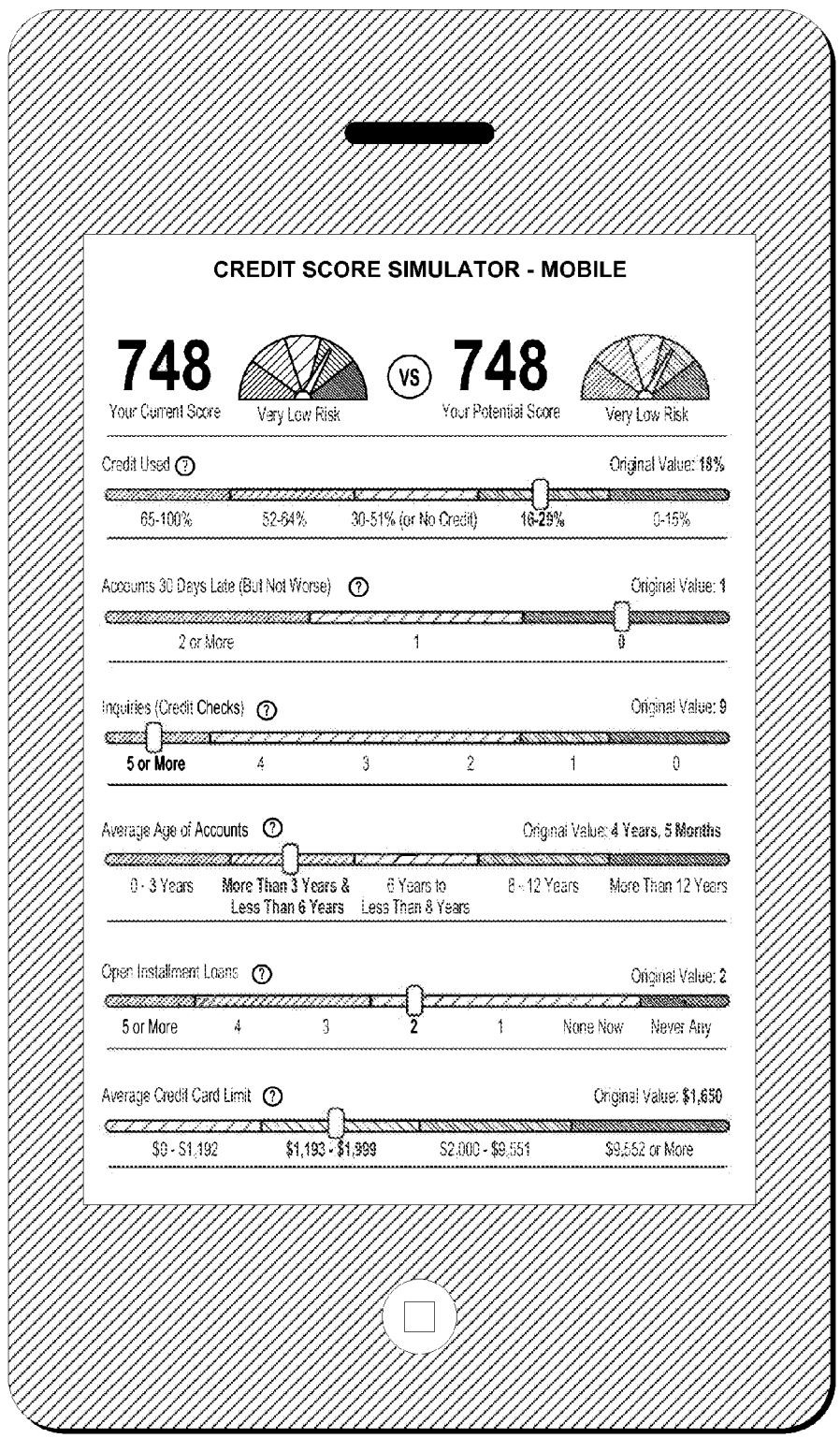
FIGS. 13A-D are sample user interfaces presented on a mobile application, as used in an embodiment.
Figure 13B:
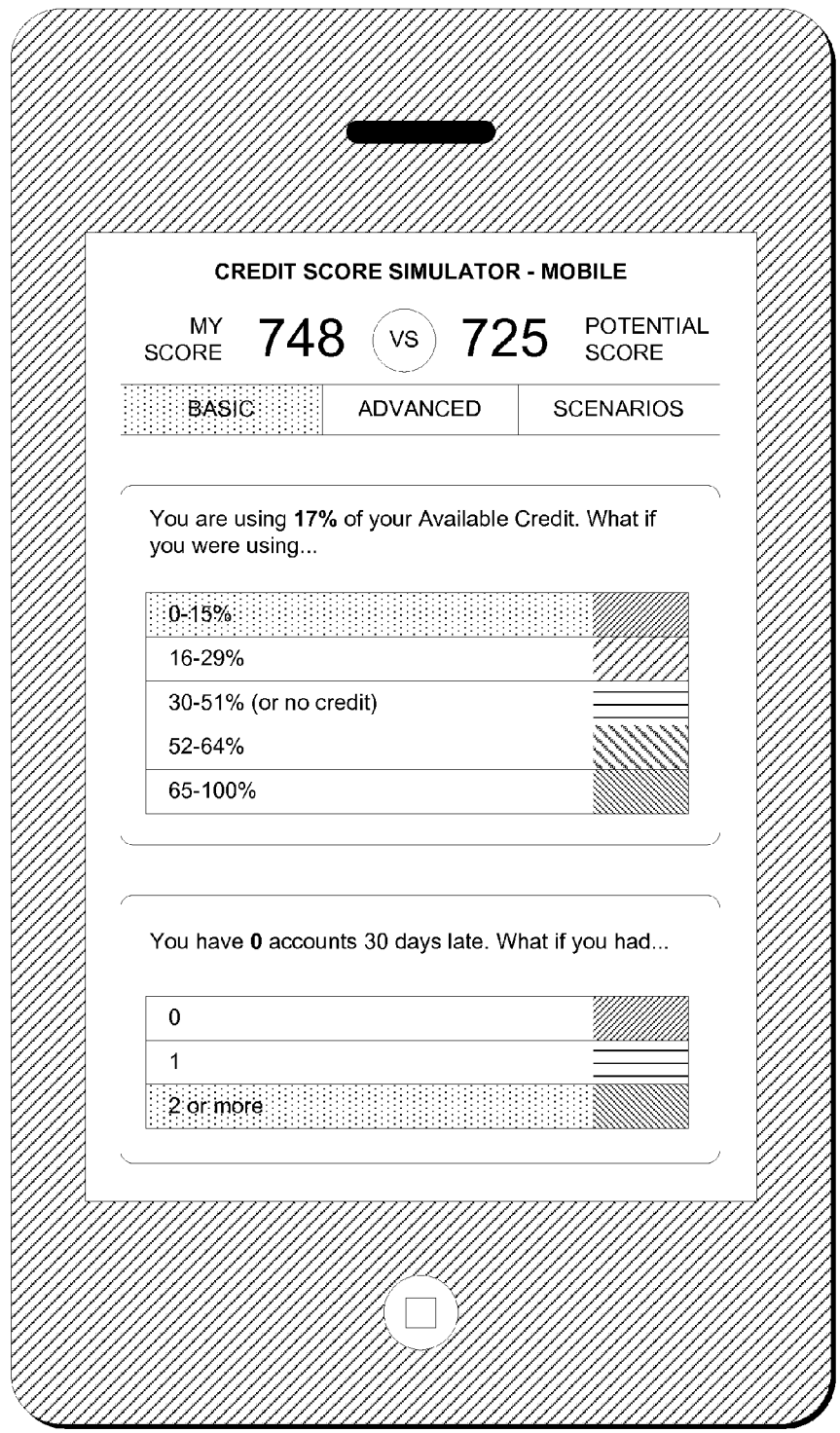
Figure 13C:
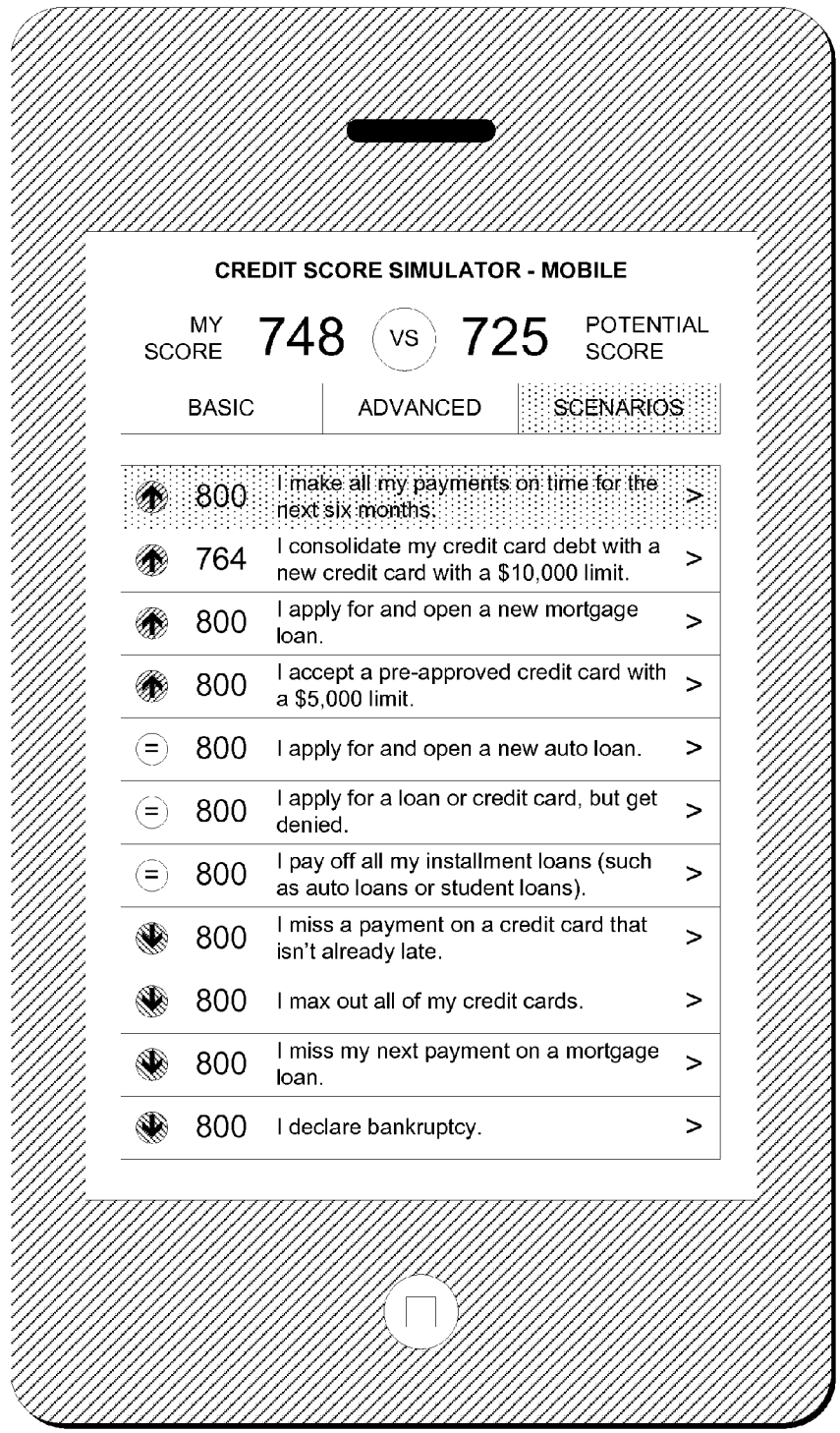
Figure 13D:
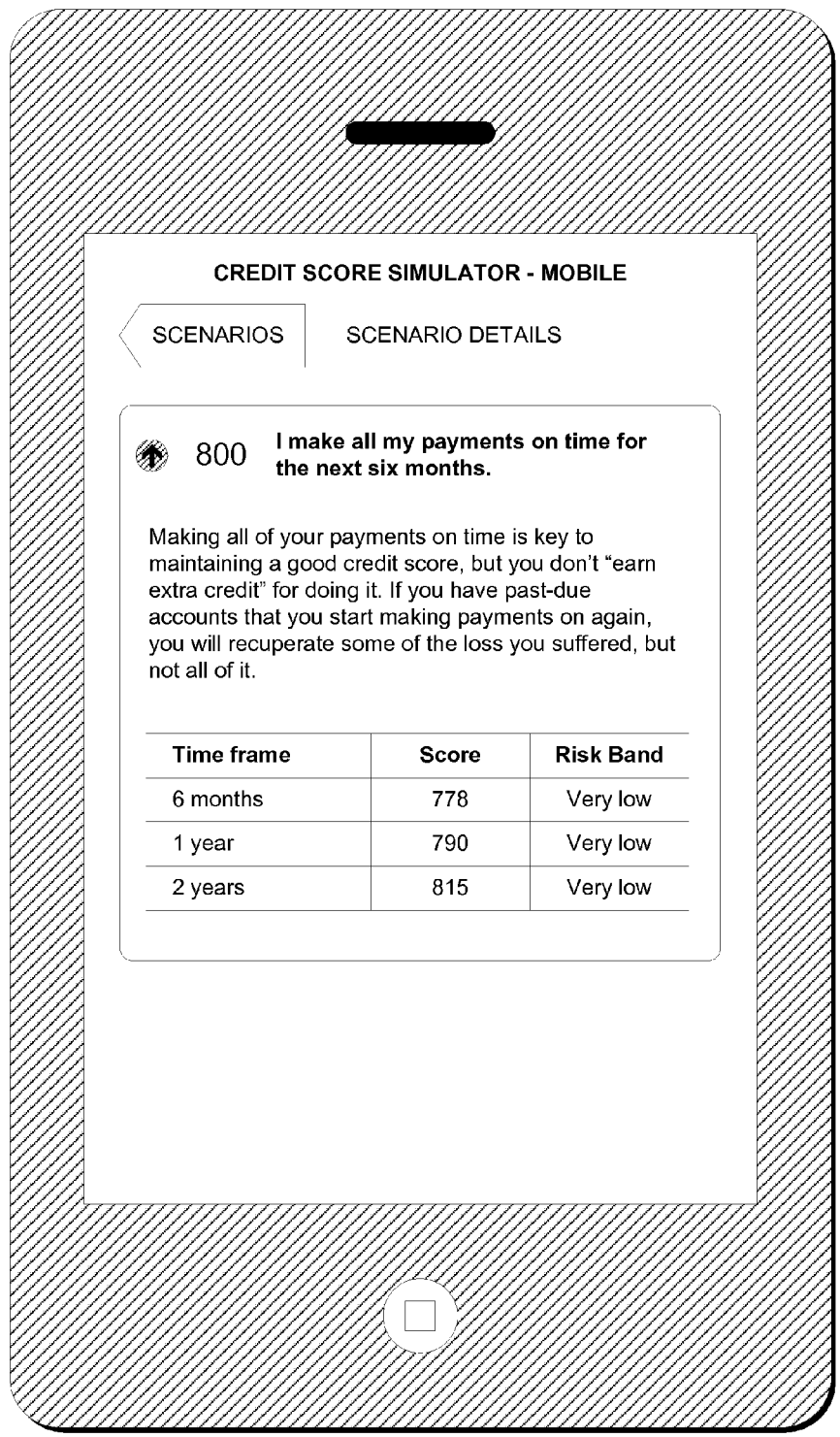

FIG. 12 is a flow chart of a process of displaying a user interface with multiple simulation control such as that shown in FIG. 8 as used in an embodiment. At block 1201, the system displays source simulation data. This data may be displayed in an interface such as that shown in FIG. 8. At block 1202, the user manipulates the user interface to adjust one or more user interface elements. The interaction may be performed by one or more mouse clicks, touches or gestures on a touch screen, drag and drop operations, keyboard inputs, voice commands, or other mechanisms. The client computer then determines appropriate simulation parameters based on the adjusted interface elements.

In various embodiments, the client computer may then proceed to perform either block 1203, block 1204, or a combination thereof. At block 1203, the client computer transmits a request to the credit score simulation system including values associated with the adjusted interface elements. The request may include data indicating those adjusted interface elements using a variety of formats in accordance with the protocol understood by the credit score simulation system. In response, the credit score simulation system may transmit updated user interface data or other data to the client computer.

Alternatively, at block 1204, the client computer may calculate an updated simulated credit score and/or other information using client-side code such as JavaScript code. In such an embodiment, the client computer does not need to communicate with the credit score simulation server which provides some possible performance benefits to the user of the client computer.

In an embodiment, rather than calculating an updated score at either block 1203 or 1204, only a score delta value is calculated, indicating not the resulting simulated credit score but a difference between the actual credit score and the simulated credit score. Executable code on the client computer or score simulator system may then be configured to update the user interface to reflect the simulated credit score, calculated based on the actual credit score and the delta value.

At block 1205, the system updates the overall score display of the user interface. Such updating may involve, for example, displaying a new simulated credit score and/or updating graphical or textual representations of the associated credit risk. In an embodiment, the updates of the overall score display is performed substantially in real time so that there is minimal delay between the adjustment of the user interface elements and the update of the score display. This provides a benefit to the user of being able to immediately view the effect of changes to the various interface elements.

FIGS. 13A-D are sample user interfaces on a mobile device, as used in an embodiment. In various embodiments, all of these interfaces, a subset of these interfaces, and/or additional interfaces may be presented. In a mobile context, the credit score simulation system may communicate with a dedicated application executing on a mobile or other computing device, or it may transmit web page data or other data that may be understood by the mobile device. The user interfaces presented by the mobile device may be similar to the web page interfaces described above, or they may be adjusted to comport with the specifications and features of the device. Additionally, the manner in which the user interacts with the mobile application may be different, in some embodiments. For example, the user may use touch screen input such as gestures to control the interface, rather than mouse input.

Example System Architecture

Figure 14:
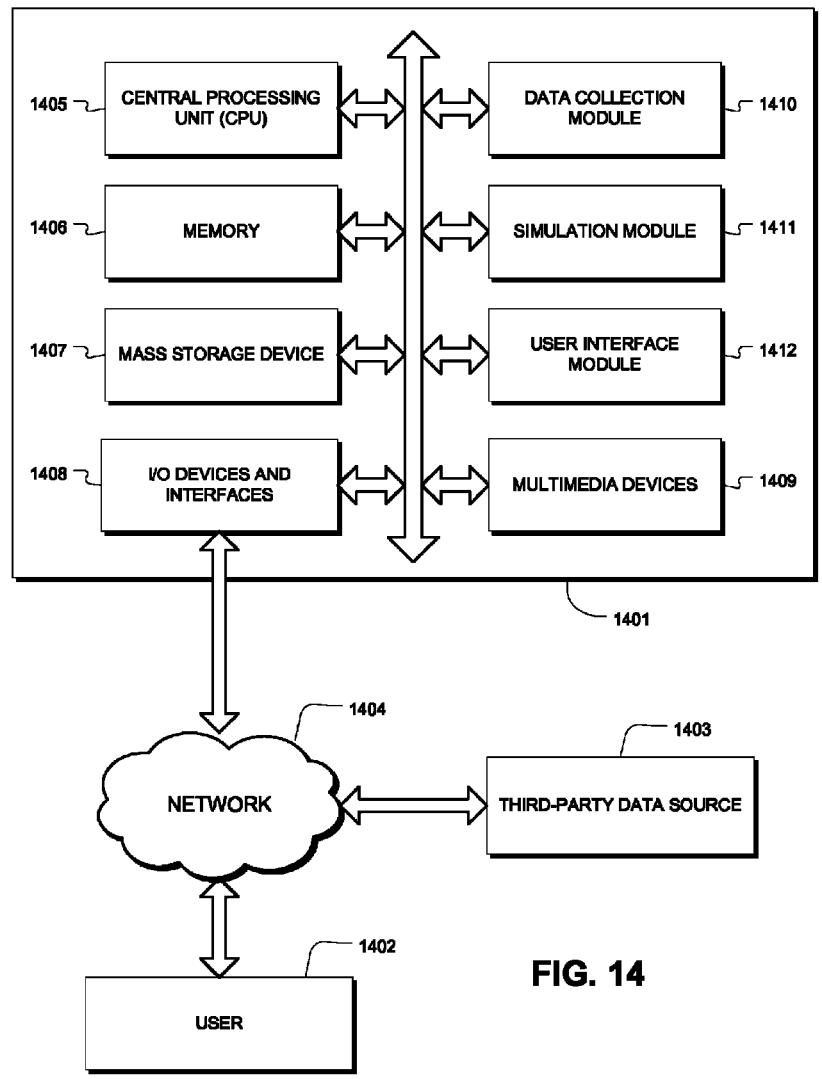
FIG. 14 is a block diagram of a computing system, as used in an embodiment.

FIG. 14 is a block diagram illustrating one embodiment of a system that manages calendar data. In the embodiment of FIG. 14, a computing device 1401 is in communication with a user 1402, as well as an optional third-party data source 1403, via a network 1404. In an embodiment, the computing device 1401 receives data, such as credit data, from one or more data sources 1403 and accesses the data to identify information regarding one or more entities. The computing device 1401 may then perform analysis and prepare information for presentation to the user 1402. The credit score simulation system 101 may include the same or similar components as the computing device 1401. Similarly, the computing devices 1401 may be used to implement any of the methods discussed herein.

The network 1404 may include any communication network or combination of communication networks, such as one or more of the Internet, LANs, WANs, MANs, etc., for example. In the embodiment of FIG. 14, the computing device 1401 includes a computing system having one or more computing devices (e.g., computers). The computing device 1401 may include, for example, a single computing device, a computer server, a smart storage unit, or a combination of one or more computing devices and/or computer servers. Depending on the embodiment, the components illustrated in the computing device 1401 may be distributed amongst multiple devices, such as via a local area or other network connection. In other embodiments the computing device 1401 may include fewer and/or additional components that are illustrated in FIG. 14.

The exemplary computing device 1401 may be a general purpose computer using one or more microprocessors, such as, for example, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, and so forth. The computer may run a variety of operating systems that perform standard operating system functions such as, for example, opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Windows® 7, Palm Pilot OS, Apple® MacOS®, Disk Operating System (DOS), UNIX, IRIX, Solaris, SunOS, FreeBSD, Linux®, or IBM® OS/2® operating systems. In other embodiments, the computing device 1401 may be controlled by a proprietary operating system. Conventional operating systems control and schedule computer processes for execution, perform memory management, provide file system, networking, I/O services, and provide a user interface, such as a graphical user interface ("GUI"), among other things.

The computing device 1401 includes one or more central processing units ("CPU") 1405, which may each include one or more conventional or proprietary microprocessor(s). The computing device 1401 may further include one or more memories 1406, such as random access memory ("RAM"), for temporary storage of information, read only memory ("ROM") for permanent storage of information, and/or a mass storage device 1407, such as a hard drive, diskette, or optical media storage device. The memory 1406 may store software code, or instructions, for execution by the processor 1405 in order to cause the computing device to perform certain operations, such as gathering sensor-related data, processing the data with statistical and/or predictive models, formatting data for user devices or other presentation, transmitting data, or other operations described or used herein.

The methods described and claimed herein may be performed by any suitable computing device, such as the computing device 1401. The methods may be executed on such suitable computing devices in response to execution of software instructions or other executable code read from a non-transitory tangible computer readable medium or computer storage device. A computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

The exemplary computing device 1401 may include one or more input/output (I/O) devices and interfaces 1408, such as a keyboard, trackball, mouse, drawing tablet, joystick, game controller, touchscreen (e.g., capacitive or resistive touchscreen), touchpad, accelerometer, and/or printer, for example. The computing device 1401 may also include one or more multimedia devices 1409, such as a display device (also referred to herein as a display screen), which may also be one of the I/O devices 1408 in the case of a touchscreen, for example. Display devices may include LCD, OLED, or other thin screen display surfaces, a monitor, television, projector, or any other device that visually depicts user interfaces and data to viewers. The computing device 1401 may also include one or more multimedia devices, such as speakers, video cards, graphics accelerators, and microphones, for example.

In the embodiment of FIG. 14, the I/O devices and interfaces 1408 provides a communication interface to various external devices via the network 1404. For example, the computing device 1401 may be electronically coupled to the network 1404 via a wired, wireless, or combination of wired and wireless, communication link(s). The network 1404 may allow communication with various other computing devices and/or other electronic devices via wired or wireless communication links.

In the embodiment of FIG. 14, the computing device 1401 may include a data collection module 1410, a simulation module 1411, and a user interface module 1412, as well as other modules or fewer modules. Each of these modules is discussed in further detail below. In general, the word "module," as used herein, refers to logic embodied in hardware or firmware, or to a collection of software instructions, possibly having entry and exit points, written in any programming language, such as, for example, Java, Python, Perl, Lua, C, C++, C#, Objective C, etc. A software module may be compiled and linked into an executable program, installed in a dynamic link library, or may be written in an interpreted programming language such as, for example, BASIC, Perl, or Python. Software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing device 1401, for execution by the computing device. Hardware modules may be comprised of connected logic units, such as gates and flip-flops, and/or may be comprised of programmable units, such as programmable gate arrays or processors. The modules described herein are typically implemented as software modules, but may be implemented in hardware, firmware and/or software. Generally, the modules described herein refer to logical modules that may be combined with other modules or divided into sub-modules despite their physical organization or storage.

Example Modules

In the embodiment of FIG. 14, the computing device 1401 includes three modules, namely, a data collection module 1410, a simulation module 1411, and a user interface module 1412. In this embodiment, each of the modules is shown as part of the computing device 1401. However, in other embodiments, the modules may be distributed across multiple devices, and may be controlled and/or operated by multiple different entities. These modules are configured to perform methods as described throughout this specification. In various embodiments, fewer or additional modules may be included within a computing system.

The computing device 1401 may be configured to acquire user data and other external data such as third-party data. The various modules may comprise software alone, hardware alone, or a combination of software and hardware. The device may be especially adapted to communicate using a variety of network or communications protocols in order to communicate with the sensors or external data sources. Some of these protocols may include standard network protocols, such as HTTP, FTP, SNMP, or the like. The device may further include hardware drivers, such as USB, FireWire, Thunderbolt (Light Peak), or serial communications drivers, for example to communicate with devices in direct communication with the system.

The computing device 1401 may be configured to transmit, or initiate transmission of, data such as user interfaces, data reports, application programming interface, data, or the like, to requesting entities, such as external user 1402, that have registered interest with the system. In one embodiment, the device provides the data in an unformatted data structure, such as in an XML, CSV, TXT, or other spreadsheet, text, or web accessible data structure. In other embodiments, the device provides information in user interfaces, such as user interfaces that are configured for rendering by a web browser, mobile device, tablet device, or other device or application, for display to users. A variety of different presentations may be provided. In some embodiments, the requesting entities may indicate presentation preferences or configurations (e.g., data formats and/or types of information), and the device may transmit data based on the indicated preferences or configurations. The presentation format may also be determined based on the type of device being used by the user.

In an embodiment, any or all of the modules 1410-1412 are configured to act in real time. Thus, when data is received by the modules, the modules process that data as soon as practicable or necessary to provide users with timely information. In order to achieve this, specialized hardware may be used to gain efficiency, and executable code may be designed to minimize latency or computation time. In an embodiment, the modules, possibly with other modules of the system, are executed within a real-time operating system, to enhance the responsiveness of the system.

Several flowcharts and related methods are described throughout this specification. Although each flowchart illustrates a particular quantity of blocks, the methods associated with the flowcharts may include any subset of illustrated blocks, or may include additional blocks that are not illustrated. Also, the blocks may be performed in orders different than illustrated in the figures. Software code configured for execution on a computing system in order to perform the methods of respective flowcharts may be provided on a computer readable medium, such as a compact disc, digital video disc, flash drive, hard drive, memory device or any other tangible medium. Such software code may be stored, partially or fully, on a memory of a computing system, in order to perform the illustrated methods by those respective devices. For ease of explanation, the methods will be described herein as performed by a computing system, which should be interpreted to include any one or more of the computing systems noted above, any combination of those computing systems, and/or any other suitable computing system.

Although this disclosure has been described in terms of certain example embodiments and applications, other embodiments and applications that are apparent to those of ordinary skill in the art, including embodiments and applications that do not provide all of the benefits described herein, are also within the scope of this disclosure.

All publications and patent applications mentioned in this specification are herein incorporated by reference in their entirety to the same extent as if each individual publication or patent application was specifically and individually indicated to be incorporated by reference.

What is claimed is:

1. A method of automatically calculating credit score simulation information associated with a user in a networked computing system, the networked computing system comprising:
- a credit data warehouse comprising a plurality of credit files having credit parameters associated with a corresponding plurality of users;
- a plurality of user computing devices associated with corresponding of the plurality of users, the user computing devices each capable of requesting credit score simulation information,
- a credit simulator server, executing computer instructions including a plurality of modules including at least:
- a credit score calculator module comprising a credit score calculation algorithm that generates a credit score based on a plurality of input parameters such that the credit score calculation algorithm is executable on a plurality of sets of input parameters in order to output a corresponding plurality of corresponding credit scores;
- a credit score simulation module comprising a predefined plurality of credit score simulation scenarios for application to credit information of each of a plurality of users, wherein the predefined plurality of credit score simulation scenarios are the same for each of the plurality of users, independent of different credit information of respective users, wherein each of the credit score simulation scenarios indicates at least:
- a parameter of the credit score calculation algorithm;
- a parameter adjustment rule indicating a mathematical effect of changes in the parameter to credit scores; and
- a textual description of the credit score simulation scenario;
- wherein the predefined plurality of credit score simulation scenarios include at least:
- a first predefined credit score simulation scenario associated with a timely payment parameter of the credit score calculation algorithm and first parameter adjustment rules indicating a first mathematical effect of changes in timely payment activities on credit scores calculated by the credit score calculation algorithm;
- a second predefined credit score simulation scenario associated with a credit card offer acceptance parameter of the credit score calculation algorithm and second parameter adjustment rules indicating a second mathematical effect of acceptance of credit card offers on credit scores calculated by the credit score calculation algorithm;
- at least third, fourth, and fifth predefined credit score simulation scenarios each associated with different parameter adjustment rules indicating impact of adjustments to a corresponding parameter on credit scores calculated by the credit score calculation algorithm;
- the credit score simulation module:
- accesses, from the credit data warehouse, credit information relating to a first user of the plurality of users, the credit information including a plurality of credit parameters specific to the first user;
- calculates, a current credit score of the first user by evaluating the credit score calculation algorithm based least on the plurality of credit parameters specific to the user accessed form the credit data warehouse;
- for each of the predefined plurality of credit score simulation scenarios, including the first, second, third, fourth, and fifth predefined credit score simulation scenarios:
- based on the parameter adjustment rule associated with the respective credit score simulation scenario, determines one or more credit parameters specific to the first user to modify prior to calculating a scenario credit score for the predefined credit score simulation scenario;
- for each of the determined one or more credit parameters to modify, generates a scenario credit parameter; and
- calculates a scenario credit score using the credit score calculation algorithm based at least on the one or more generated scenario credit parameters;
- wherein at least a first scenario credit score, a second scenario credit score, a third scenario credit score, a fourth scenario credit score, and a fifth scenario credit score are calculated based on respective scenario credit parameters;
- a report generation module that:
- constructs user interface data configured for execution by a first user computing device to:
- display on a display of the first user computing device a user interface including:
- a listing of at least a portion of each of the textual descriptions of the predefined plurality of credit score simulation scenarios, and
- for each predefined plurality of credit score simulation scenarios, the corresponding calculated scenario credit score,
- a first graphical differentiation of a first one or more of the calculated scenario credit scores that are greater than the calculated current credit score of the user,
- a second graphical differentiation of a second one or more of the calculated scenario credit scores that are less than the calculated current credit score of the user, and
- interactive user interface controls in spatial relation to respective predefined credit score simulation scenarios, the user interface controls configured to initiate updates to the user interface to show or hide expanded scenario information for the corresponding predefined credit score simulation scenario;
- transmits the user interface data to the first user computing device;
- wherein the first user computing device:
- receives the user interface data;
- executes the user interface data in order to display the user interface on the display of the first user computing device;
- in response to receiving selection of a first user interface control associated with the first predefined credit score simulation scenario of the displayed user interface, determine whether the first expanded scenario information is cached on the first user computing device; and
- in response to determining that the first expanded scenario information is not cached on the first user computing device, transmitting a request to the credit simulation server for first expanded scenario information corresponding to the first predefined credit score simulation scenario;
- wherein the credit simulation server is further configured to, in response to receiving the request for the first expanded scenario information from the first user computing device:
- determine the first expanded scenario information by:
- calculating a first simulated future scenario credit score associated with a first future time period;
- calculating a second simulated future scenario credit score associated with a second future time period;

transmitting updated user interface data to the first user computing device, the updated user interface data including an expanded information pane to be positioned below the first predefined credit score simulation scenario, the expanded information pane indicating:

the first future time period and the associated first simulated future scenario credit score of the user indicating a first hypothetical future credit score of the first user after the first future time period in response to timely payments made by the user during the first future time period;

the second future time period and the associated second simulated future scenario credit score user indicating a second hypothetical future credit score of the first user after the second future time period in response to timely payments made by the user during the second future time period; and transmit the updated user interface data to the first user computing device; or in response to determining that the first expanded scenario information is cached on the first user computing device, updating the user interface data to include an expanded information pane below the first predefined credit score simulation scenario, the expanding information pane indicating:

the first future time period and the associated first simulated future scenario credit score of the user indicating a first hypothetical future credit score of the first user after the first future time period in response to timely payments made by the user during the first future time period;

the second future time period and the associated second simulated future scenario credit score user indicating a second hypothetical future credit score of the first user after the second future time period in response to timely payments made by the user during the second future time period; and render the updated user interface data on the display of the first user computing device.

2. The method of claim 1, wherein the predefined plurality of credit score simulation scenarios are sorted by respective simulated credit scores of the predefined plurality of credit score simulation scenarios.

3. A computing system for automatically calculating credit score simulation information associated with a user, the computing system comprising:

one or more hardware computer processors configured to:

access a credit score calculation algorithm configured to generate a credit score based on a plurality of input parameters such that the credit score calculation algorithm is executable on a plurality of sets of input parameters in order to output a corresponding plurality of corresponding credit scores;

access a predefined plurality of credit score simulation scenarios for application to credit information of each of a plurality of consumers, wherein the predefined plurality of credit score simulation scenarios are the same for each of the plurality of consumers, independent of different credit information of respective consumers, wherein each of the credit score simulation scenarios indicates at least:

a parameter of a credit score calculation algorithm;

a parameter adjustment rule indicating a mathematical effect of changes in the parameter to credit scores of consumer;

a textual description of the credit score simulation scenario;

wherein the predefined plurality of credit score simulation scenarios include at least:

a first predefined credit score simulation scenario associated with a timely payment parameter of the credit score calculation algorithm and first parameter adjustment rules indicating a first mathematical effect of changes in timely payment activities on credit scores calculated by the credit score calculation algorithm;

a second predefined credit score simulation scenario associated with a credit card offer acceptance parameter of the credit score calculation algorithm and second parameter adjustment rules indicating a second mathematical effect of acceptance of credit card offers on credit scores calculated by the credit score calculation algorithm;

at least third, fourth, and fifth predefined credit score simulation scenarios each associated with different parameter adjustment rules indicating impact of adjustments to a corresponding parameter on credit scores calculated by the credit score calculation algorithm;

access credit information relating to a first consumer of the plurality of consumers, the credit information including a plurality of credit parameters specific to the first consumer;

for each of the predefined plurality of credit score simulation scenarios, including the first, second, third, fourth, and fifth predefined credit score simulation scenarios:

based on the parameter adjustment rule associated with the respective credit score simulation scenario, determine one or more credit parameters specific to the first consumer to modify prior to calculating a scenario credit score for the predefined credit score simulation scenario;

for each of the determined one or more credit parameters to modify, generate a scenario credit parameter;

calculate a scenario credit score using the credit score calculation algorithm based at least on the one or more generated scenario credit parameters;

wherein at least a first scenario credit score, a second scenario credit score, a third scenario credit score, a fourth scenario credit score, and a fifth scenario credit score are calculated based on respective scenario credit parameters;

construct user interface data configured for execution by a user computing device to:

display on a display of the user computer device:

a listing of at least a portion of each of the textual descriptions of the predefined plurality of credit score simulation scenarios, and for each predefined plurality of credit score simulation scenarios, the corresponding calculated scenario credit score, a first graphical differentiation of a first one or more of the calculated scenario credit scores that are greater than a current credit score of the consumer, a second graphical differentiation of a second one of the calculated scenario credit scores are less than the current credit score of the consumer, and interactive user interface controls in spatial relation to respective predefined credit score simulation scenarios, the user interface controls configured to initiate updates to the user interface to show or hide expanded scenario information below the corresponding predefined credit score simulation scenario when selected;

in response to user selection of a first user interface control associated with the first predefined credit score simulation scenario, determine whether the first expanded scenario information is cached on the user computing device; and in response to determining that the first expanded scenario information is not cached on the user computing device, transmit a request to the computing system for first expanded scenario information corresponding to the first predefined credit score simulation scenario;

wherein the computing system is further configured to:

determine the first expanded scenario information by:

calculating a first scenario credit score associated with a first future time period;

calculating a second scenario credit score associated with a second future time period;

updating the user interface data to indicate:

the first time future time period and the associated first scenario credit score, wherein the first scenario credit score indicates a first simulated future credit score of the consumer after the first future time period in response to timely payments made by the consumer during the first future time period;

the second time future time period and the associated second scenario credit score, wherein the second scenario credit score indicates a second simulated future credit score of the consumer after the second future time period in response to timely payments made by the consumer during the second future time period; and transmit the updated user interface data to the user computing device;

in response to determining that the first expanded scenario information is cached on the user computing device, updating the user interface data to indicate:

the first time future time period and the associated first scenario credit score, wherein the first scenario credit score indicates a first simulated future credit score of the consumer after the first future time period in response to timely payments made by the consumer during the first future time period;

the second time future time period and the associated second scenario credit score, wherein the second scenario credit score indicates a second simulated future credit score of the consumer after the second future time period in response to timely payments made by the consumer during the second future time period; and render the updated user interface data on the display device of the user computing device.

4. Non-transitory physical computer storage comprising computer-executable instructions that, when executed by a computing system, are configured to:

access a credit score calculation algorithm configured to generate a credit score based on a plurality of input parameters such that the credit score calculation algorithm is executable on a plurality of sets of input parameters in order to output a corresponding plurality of corresponding credit scores;

access a predefined plurality of credit score simulation scenarios for application to credit information of each of a plurality of consumers independent, wherein the predefined plurality of credit score simulation scenarios are the same for each of the plurality of consumers, independent of different credit information of respective consumers, wherein each of the credit score simulation scenarios indicates at least:

a parameter of a credit score calculation algorithm;

a parameter adjustment rule indicating a mathematical effect of changes in the parameter to credit scores of consumer;

a textual description of the credit score simulation scenario;

wherein the predefined plurality of credit score simulation scenarios include at least:

a first predefined credit score simulation scenario associated with a timely payment parameter of the credit score calculation algorithm and first parameter adjustment rules indicating a first mathematical effect of changes in timely payment activities on credit scores calculated by the credit score calculation algorithm;

a second predefined credit score simulation scenario associated with a credit card offer acceptance parameter of the credit score calculation algorithm and second parameter adjustment rules indicating a second mathematical effect of acceptance of credit card offers on credit scores calculated by the credit score calculation algorithm;

at least third, fourth, and fifth predefined credit score simulation scenarios each associated with different parameter adjustment rules indicating impact of adjustments to a corresponding parameter on credit scores calculated by the credit score calculation algorithm;

access credit information relating to a first consumer of the plurality of consumers, the credit information including a plurality of credit parameters specific to the first consumer;

for each of the predefined plurality of credit score simulation scenarios, including the first, second, third, fourth, and fifth predefined credit score simulation scenarios:

based on the parameter adjustment rule associated with the respective credit score simulation scenario, determining one or more credit parameters specific to the first consumer to modify prior to calculating a scenario credit score for the predefined credit score simulation scenario;

for each of the determined one or more credit parameters to modify, generating a scenario credit parameter;

calculating a scenario credit score using the credit score calculation algorithm based at least on the one or more generated scenario credit parameters;

wherein at least a first scenario credit score, a second scenario credit score, a third scenario credit score, a fourth scenario credit score, and a fifth scenario credit score are calculated based on respective scenario credit parameters;

generate user interface data configured for execution by a user computing device to:

display on a display of the user computer device:

a listing of at least a portion of each of the textual descriptions of the predefined plurality of credit score simulation scenarios, and for each predefined plurality of credit score simulation scenarios, the corresponding calculated scenario credit score, a first graphical differentiation of a first one or more of the calculated scenario credit scores that are greater than a current credit score of the consumer, a second graphical differentiation of a second one of the calculated scenario credit scores are less than the current credit score of the consumer, and interactive user interface controls in spatial relation to respective predefined credit score simulation scenarios, the user interface controls configured to initiate updates to the user interface to show or hide expanded scenario information below for the corresponding predefined credit score simulation scenario when selected;

in response to user selection of a first user interface control associated with the first predefined credit score simulation scenario, determine whether the first expanded scenario information is cached on the user computing device; and in response to determining that the first expanded scenario information is not cached on the user computing device, transmit a request to the computing system for first expanded scenario information corresponding to the first predefined credit score simulation scenario;

wherein the computing system is further configured to:

determine the first expanded scenario information by:

calculating a first scenario credit score associated with a first future time period;

calculating a second scenario credit score associated with a second future time period;

updating the user interface data to indicate:

the first time future time period and the associated first scenario credit score, wherein the first scenario credit score indicates a first simulated future credit score of the consumer after the first future time period in response to timely payments made by the consumer during the first future time period;

the second time future time period and the associated second scenario credit score, wherein the second scenario credit score indicates a second simulated future credit score of the consumer after the second future time period in response to timely payments made by the consumer during the second future time period; and transmit the updated user interface data to the user computing device;

in response to determining that the first expanded scenario information is cached on the user computing device, updating the user interface data to indicate:

the first time future time period and the associated first scenario credit score, wherein the first scenario credit score indicates a first simulated future credit score of the consumer after the first future time period in response to timely payments made by the consumer during the first future time period;

the second time future time period and the associated second scenario credit score, wherein the second scenario credit score indicates a second simulated future credit score of the consumer after the second future time period in response to timely payments made by the consumer during the second future time period; and render the updated user interface data on the display device of the user computing device.

* * * * *